(12) United States Patent
Castiel et al.

(10) Patent No.: US 6,678,519 B2
(45) Date of Patent: Jan. 13, 2004

(54) ELLIPTICAL SATELLITE SYSTEM WHICH EMULATES THE CHARACTERISTICS OF GEOSYNCHRONOUS SATELLITES

(75) Inventors: David Castiel, Washington, DC (US); John Draim, Vienna, VA (US); Kenneth F. Manning, McLean, VA (US)

(73) Assignee: Virtual Geosatellite, LLC, Washington, DC (US)

( * ) Notice: Subject to any disclaimer, the term of this patent is extended or adjusted under 35 U.S.C. 154(b) by 0 days.

(21) Appl. No.: 09/892,132

(22) Filed: Jun. 25, 2001

(65) Prior Publication Data

US 2001/0051521 A1 Dec. 13, 2001

Related U.S. Application Data

(63) Continuation of application No. 09/235,942, filed on Jan. 22, 1999, which is a continuation of application No. 09/056,051, filed on Apr. 6, 1998, now Pat. No. 6,263,188, which is a continuation of application No. 08/409,808, filed on Mar. 24, 1995, now Pat. No. 5,845,206.

(51) Int. Cl.[7] ............................................. H04Q 7/20
(52) U.S. Cl. .................... 455/427; 455/430; 455/12.1; 455/13.2; 455/13.3; 455/428; 455/429; 342/356; 244/158
(58) Field of Search .......................... 455/13.1, 13.2, 455/13.3, 13.4, 428, 429, 430, 427, 12.1, 18, 63, 127; 342/356; 244/158

(56) References Cited

U.S. PATENT DOCUMENTS

| | | | |
|---|---|---|---|
| 3,163,820 A | * | 12/1964 | Hight ........................ 455/12.1 |
| 3,340,531 A | * | 9/1967 | Kefalas et al. ............. 455/13.3 |
| 3,497,807 A | * | 2/1970 | Newton | |
| 3,636,539 A | | 1/1972 | Gaddy |
| 3,740,636 A | | 6/1973 | Hiogrefe et al. |
| 3,835,253 A | | 9/1974 | Bond |
| 3,836,969 A | | 9/1974 | Bond et al. |
| 4,375,697 A | | 3/1983 | Visher |
| 4,494,063 A | | 1/1985 | Callen et al. |
| 4,502,051 A | | 2/1985 | Dondl |
| 4,731,870 A | * | 3/1988 | Black et al. ............... 455/13.4 |

(List continued on next page.)

OTHER PUBLICATIONS

Application of Ellipsat Corporation to FCC, Apr. 1991.*
Ellipsat Corporation, Ellipso I—An Elliptical Orbit Satellite System FCC aplication.*
Ellipsat Corporation application before the Federal Communications Commission.
Pennoni, G. "JOCOS: 6+1 Satellites for Global Mobile Communications", Proceedings of the Global Telecommunications Conference, (Globecom), New York (US), IEEE, Nov. 28, 1994, pp 1369–1374.

Primary Examiner—William Trost
(74) Attorney, Agent, or Firm—Fish & Richardson P.C.

(57) ABSTRACT

An elliptical satellite communication system including a constellation of satellites which orbit the earth at a height less than that necessary for geosynchronous orbits but which simulate the characteristics of geosynchronous orbits. The satellites' velocity near the apogee portion of their orbit approximates the rotational velocity of the earth, and during that period appear to hover over the earth. The ground stations on the earth always communicate with a satellite at or near its apogee, and hence that satellite appears to the ground station to hover over the earth. During the times when the satellite is outside the apogee portion, its communication is shut off to prevent any possibility of interfering with geosynchronous satellites and its power supply is used to charge a battery on the satellite. Thus, the power supply of the system can be reduced by an amount equivalent to the percentage of time the satellite is not used.

15 Claims, 20 Drawing Sheets

U.S. PATENT DOCUMENTS

| | | | |
|---|---|---|---|
| 4,819,272 A | * | 4/1989 | Shimo et al. ................ 455/127 |
| 4,827,421 A | * | 5/1989 | Dondl ........................ 342/356 |
| 5,285,208 A | | 2/1994 | Bertiger et al. |
| 5,326,054 A | * | 7/1994 | Turner ..................... 244/158 R |
| 5,394,075 A | | 2/1995 | Ahrens et al. |
| 5,408,237 A | * | 4/1995 | Patterson et al. ........... 455/428 |
| 5,439,190 A | | 8/1995 | Horstein et al. |
| 5,530,335 A | | 6/1996 | Decker et al. |
| 5,543,813 A | * | 8/1996 | Araki et al. ................ 342/352 |
| 5,553,816 A | * | 9/1996 | Perrotta ..................... 455/12.1 |
| 5,559,806 A | * | 9/1996 | Kurby et al. .............. 455/13.3 |
| 5,582,367 A | * | 12/1996 | Castiel et al. ........... 244/158 R |
| 5,586,165 A | * | 12/1996 | Wiedeman ................ 455/13.1 |
| 5,594,313 A | | 1/1997 | Takeda |
| 5,621,248 A | | 4/1997 | De Villiers |
| 5,669,585 A | * | 9/1997 | Castiel et al. .............. 455/13.1 |
| 5,708,963 A | | 1/1998 | Mobley et al. |
| 5,860,056 A | * | 1/1999 | Pond ........................ 455/13.3 |
| 5,871,181 A | * | 2/1999 | Mass ..................... 244/158 R |
| 5,931,417 A | * | 8/1999 | Castiel ...................... 455/12.1 |
| 6,032,902 A | * | 3/2000 | Pamade et al. ......... 244/158 R |
| 6,188,729 B1 | | 2/2001 | Perkins |

\* cited by examiner

ELLIPTICAL SATELLITE SYSTEM WHICH EMULATES THE CHARACTERISTICS OF GEOSYNCHRONOUS SATELLITES

CROSS-REFERENCE TO RELATED APPLICATIONS

This application is a continuation of and claims priority to U.S. patent application Ser. No. 09/235,942, filed Jan. 22, 1999, which is a continuation of U.S. application Ser. No. 09/056,051, filed Apr. 6, 1998 now U.S. Pat. No. 6,263,188, which is a continuation of U.S. application Ser. No. 08/409,808, filed Mar. 24, 1995, now U.S. Pat. No. 5,845,206, issued Dec. 1, 1998.

FIELD OF THE INVENTION

The present invention defines a communications system which communicates between orbiting communications satellites and ground stations. More specifically, the system uses special communications equipment that allows low orbit elliptically-orbiting satellites to emulate the communication characteristics that would be obtained from a geosynchronous satellite system. This system allows operation in a way which is similar to geosynchronous satellites, at a fraction of the cost of geosynchronous satellites.

BACKGROUND AND SUMMARY OF THE INVENTION

Geosynchronous ("geo") satellites were first proposed by Arthur C. Clarke many years ago for use with communication systems. Communication systems include television, two way communications, surveillance equipment, weather monitoring equipment and other similar equipment. geo satellites operate based on the physical concept that a satellite, at the proper working radius, orbits the earth at the same angular velocity as the earth's rotation. These satellites therefore appear to be fixed relative to a point on the earth.

This arrangement allows an antenna on the earth to continually point at the satellite. This facilitates use of the geosynchronous satellites for communications applications.

The inventors of the present invention have noted a number of drawbacks associated with geosynchronous ("geo") satellite systems. One major drawback is the cost to raise a satellite into a geo orbit. Geosynchronous orbit occurs at around 36,000 kilometers. The cost to boost the satellite into orbit is directly proportional to the height of the orbit. Therefore, it is expensive to boost a satellite into geosynchronous orbit. This cost must be amortized over the lifetime of the satellite, making geo satellites very expensive.

Another problem results from the geometry of coverage of a geosynchronous satellite system. A three satellite geostationary satellite system could have the satellites spaced equally along the equator, at 120° intervals. Their limit of visibility on the equator is calculated from the relationship:

$$2\{\cos^{-1}(R_E/a_{geo})\} = 2\{\cos^{-1}(6378/35786) = 2\{79.73 deg\} = 159.47 deg,$$

where 6378 is the radius of the earth in kilometers, and 35786 is the radius out to the geostationary ring. Taking difference between the above value and 120 degrees, it is clear that there is approximately 40 degrees of overlapping coverage by two adjacent geo satellites for an observer on the equator. There will be even less at greater latitudes. Many global services, however, require world-wide transmission of their information to the whole world. Since each of the satellites only covers one part of the world, some other way must be used to disseminate the information from the source to the satellites covering the rest of the world.

The information begins its transmission at a link. That link transmits up to the satellite in orbit, which then retransmits the information to communicate to, or "cover" one portion of the earth. The same information must also be transmitted to another of the satellites to cover another part of the earth. The information is either sent: 1) over a land line between the link on the earth and ground stations that service areas for the other satellite(s), or 2) via satellite-to-satellite transmission. The land link requires additional equipment and expense. The satellite link also requires additional equipment, but in addition operates a transmission across the two ends of the 42,000 kilometer equilateral triangle. This requires a transmission which is some 70,000 kilometers long. This system requires a second antenna on each of the satellites in addition to complicating control and pointing structure. Even then, the long communication channel may cause noise in the channel.

One of the most difficult-to-solve problem results from the geometry of the geosynchronous orbit. There is only one available orbital position ("band") for geosynchronous satellites. This band is already saturated with satellites. Satellites occupy the geo band with only 2° of spacing therebetween. These are referred to as orbital "slots". Most of the slots are now occupied, making it difficult to find positions for any more geostationary satellites. However, other satellite locations cannot be allowed to interfere with the communication to the geo satellites when operating at the same frequencies.

The system of the present invention obtains the advantages of geosynchronous satellites without using the high altitude circular orbit normally used for geo satellites. The present invention uses a plurality of satellites in orbits chosen such that each desired point of coverage on the earth communicates with a different satellite at different times, and in a direction of antenna pointing separated angularly from any geo satellite(s), such that there is no radio frequency interference, even when operating at the same frequency as a geo satellite. Thus, the present invention alleviates the present "geo-slot" problem. The lower altitudes of the present invention also lead to smaller link distances from ground-to-satellite and from satellite-to-satellite, decreasing the power required due to path loss. These lower altitudes also decrease the time delay which can be annoying in voice transmissions. Thus, the present invention provides a unique solution to some of the problems of using geo satellites.

BRIEF DESCRIPTION OF THE DRAWINGS

These and other aspects of the invention will be described with reference to the accompanying drawings in which:

FIGS. 2–1 and 2–2 show a layout of the satellite communication equipment used according to the present invention;

DESCRIPTION OF THE PREFERRED EMBODIMENT

Figure 1:
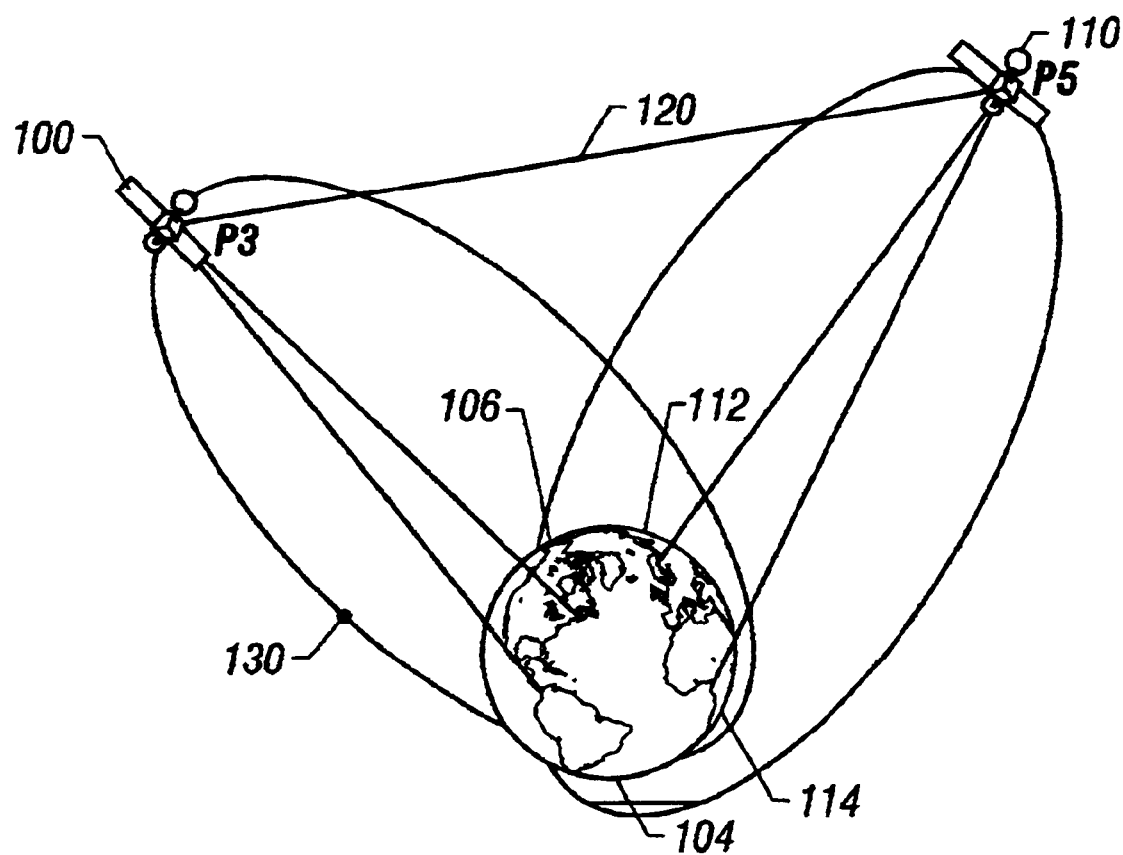
FIG. 1 shows a basic layout of the multiple elliptical orbits of the present invention.

The system of the present invention defines a communication system including ground communication equipment and a special constellation of satellites in elliptical orbits at lower altitudes than those necessary for geosynchronous, which simulate the characteristics of a geosynchronous orbit from the viewpoint of the ground communication equipment on the earth. The inventors recognized that satellites which orbit in certain elliptical orbits spend most of their time near the apogees of their orbits: the time when they are most distant from the earth. These satellites spend only a minority of their time near their perigee. For example, an elliptical satellite in a 12-hour orbit spends eight of those hours near its apogee. By appropriately choosing characteristics of the satellite orbit, the satellite can be made to orbit, during that time, at a velocity that approximates the rotational velocity of the earth. The present invention defines a communication system using a constellation of satellites chosen and operating such that a desired point on the earth always tracks and communicates with a satellite at or near apogee.

Another important feature of the present invention is the recognition of how this mode of operation of the satellite changes its power characteristics. Geosynchronous satellites are used virtually 100% of the time (except when in eclipse) and hence their power supplies must be capable of full-time powering. This means, for example, if the satellite requires 5 Kw to operate, then the power supply and solar cells must be capable of supplying a continuous 5 Kw of power. The satellites of the present invention, however, are not used 100% of the time. During the perigee portions of the satellite orbit, the satellites are typically not using most of their transmit and receive capability and hence, the inventors recognized, do not use a large part of their power capability.

The inventors of the present invention recognized this feature of the satellites, and realized that the satellites could be storing the power that is being produced during this time of non-use. Therefore, the inventors realized that the size of the power supply could be reduced by a factor of the percentage of time that the satellite is not used.

The power sources can be any known means, including solar cells, nuclear reactors, or the like. If the satellite is used half the time, then the power source need only be sized to provide half the power. At times when the satellite is not being used, the power source provides power to a battery storage cell, which holds the power in reserve for times when the satellite is being used.

Like geo systems, the satellite of the present invention is virtually continuously in the same location. Unlike geo-based systems, however, the ground communication equipment of the present invention does not always communicate with the same satellite. The satellites move slightly relative to the earth, i.e. they are not always precisely at the same point in their apogees. One important advantage of the present invention is that the one satellite at apogee later moves to perigee, and still later to other locations overlying other continents and areas. Hence, that same satellite can later communicate with those other areas. Therefore, this system allows a store-and-dump type system. The information can be stored on board the satellite and later re-transmitted when the satellite overlies those other areas. This system also allows all the satellites in the array to communicate with the other satellites in the constellation.

This system has a number of other distinct advantages. Importantly, the system operation allows selecting specific geographic locations to be preferentially covered; for example, continents can be followed by the constellation to the exclusion of other areas, e.g. ocean areas between the continents. The communication equipment on the continent always communicates with one satellite at apogee, although not always the same satellite. From the point of view of the ground station, the satellite appears to hover over the ground.

This satellite system operates virtually like a geosynchronous satellite system. Importantly, these satellites according to the present invention orbit at about half the altitude of the geo systems. A geo orbit orbits at 36,000 miles altitude: the virtual geo satellite orbits at average altitudes of 16–18,000 miles. Also, geo satellites require "apogee motors", to boost them from their original orbits into the final geo orbit. These apogee motors can double the weight of the satellite.

This yields a communications system which costs less dollars per launch capability because of the reduced weight to boost and less size. Also, since the geo satellites orbit at a higher altitude, they operate at a higher power, and use a larger illuminating antenna, all other conditions on the ground being equal. These satellites also have a much larger overall size. This size of the satellites increases as the square of the distance. Therefore, the geo satellite needs to be at least twice as large and twice as powerful as a low altitude satellite. The power supply conservation techniques of the present invention allow the satellite to be made even smaller.

The system also provides satellites with very high elevation angles. Maximizing the elevation angle prevents interference with existing satellites such as true geosynchronous satellites.

This is another feature of the present invention which allows these satellites to operate in ways which avoid any possibility of interference with the geo band.

Another objective and important feature of the present invention is its ability to re-use satellite communication channels. Regulatory agencies such as the FCC allocate frequency bands by allocating a specific frequency band for a specific purpose. The geo satellites, for example, receive an assignment of a frequency band. Thereafter, the regulatory agency will consider that other satellites located in the same orbital position can not use this frequency because of possibility of interference. Hence, frequencies in adjacent bands which might interfere with that assigned band will not be allocated for new satellite use. With the present invention, there is a large angular separation between the geo-sats and those covered by the invention. Thus, the same frequencies ca be allocated anew. Another feature of the present invention is the location of the earth stations and satellites in a way which prevents interference with the geo bands. Specifically, the present invention defines embodiments using both inclined orbits and non-inclined (equatorial) orbits. The inclined orbit embodiment of the present invention only communicates with the ground stations when a line drawn between the ground station and current position of the satellite will not intersect any point within x° of the ring of geosynchronous satellites, where x is the required separation between the communication for geo satellites and the communication for the satellites of the present invention. During other times, the equatorial component of the communication is shut off. The satellite only communicates when it is near apogee. During those times, the rotational velocity of the satellite approximates the rotational velocity of the earth, and hence the satellite tends to hang overhead relative to the earth.

For non-inclined (equatorial) orbits, the ground stations are placed in a position such that the communication does not intersect the ring of equatorial orbits.

The system is controlled by on-board processor 280, which determines the position in the orbit and the steering of the antenna from various parameters. Processor 280 carries out the flowchart shown in FIG. 2a which will be described herein.

The overall system is powered by power supply 290 which supplies power to all of the various components and circuitry which require such power. Power supply 290 includes a source of power, here shown as a solar array 292, and an energy storage element here shown as a battery array 294. Importantly, according to the present invention, the solar array 292 is sized to provide only some amount of power less than that required to power the satellite communication. The amount by which the solar array can be less is called herein the power ratio of the device. The power ratio depends on the kind of orbit that the satellite will have, and how long the satellite will be transmitting during each elliptical orbit. The preferred power ratio is 0.5: this will power a satellite which is communicating half the time, and the other half the transmitter and receiver on board the satellite is off and the solar array is providing power to charge battery 294.

Figures 1, 2:
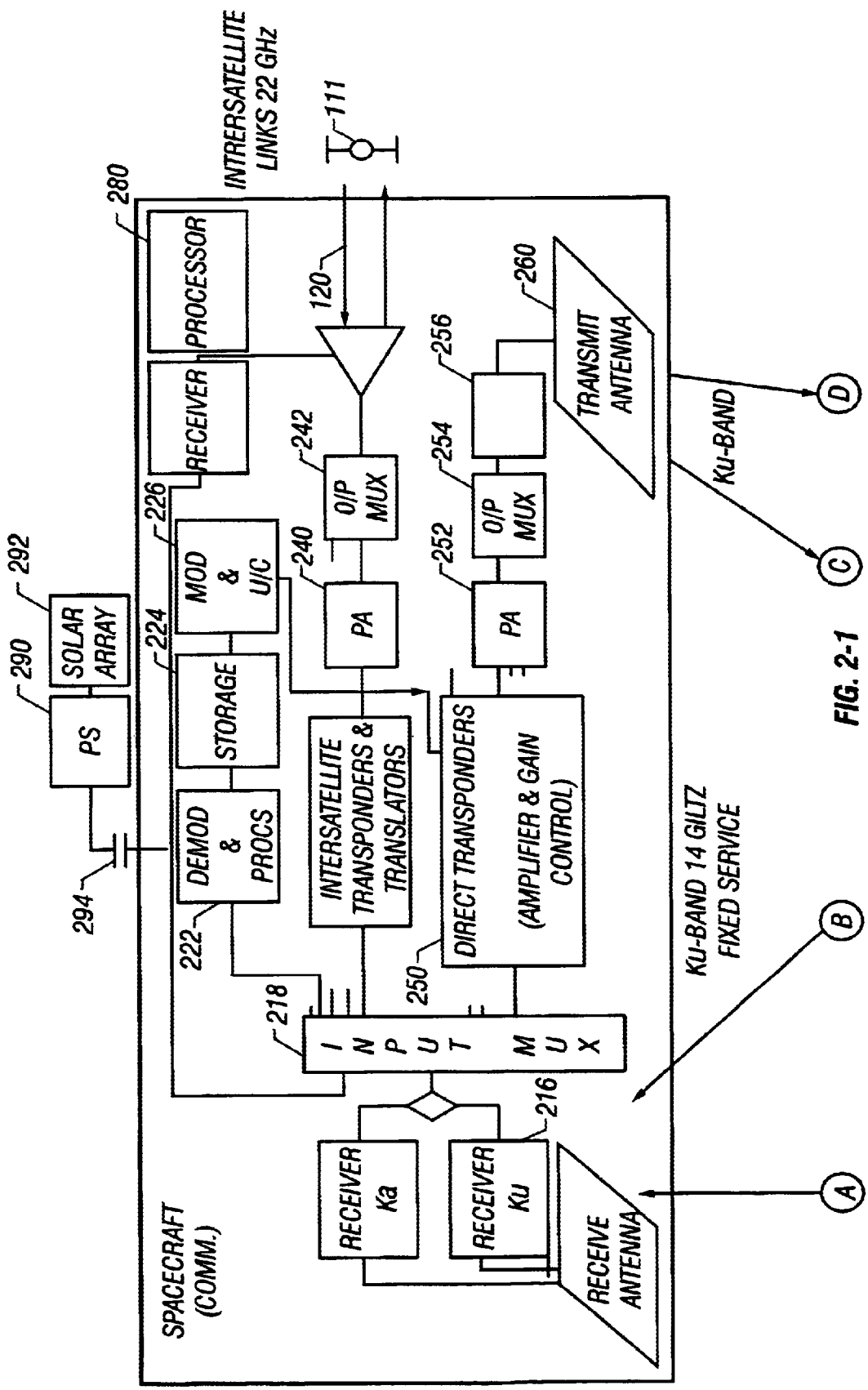
Figure 2:
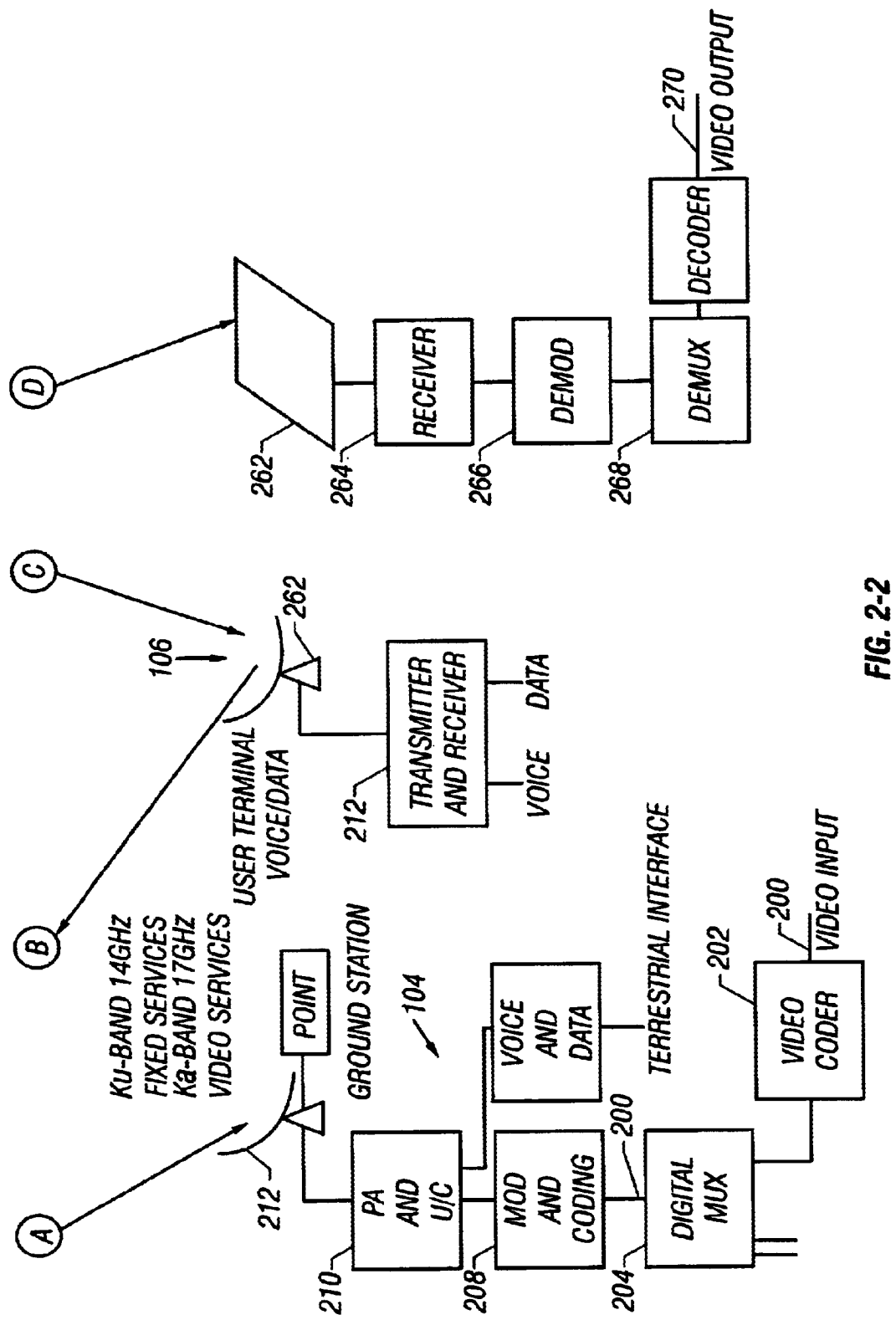
Figure 2A:
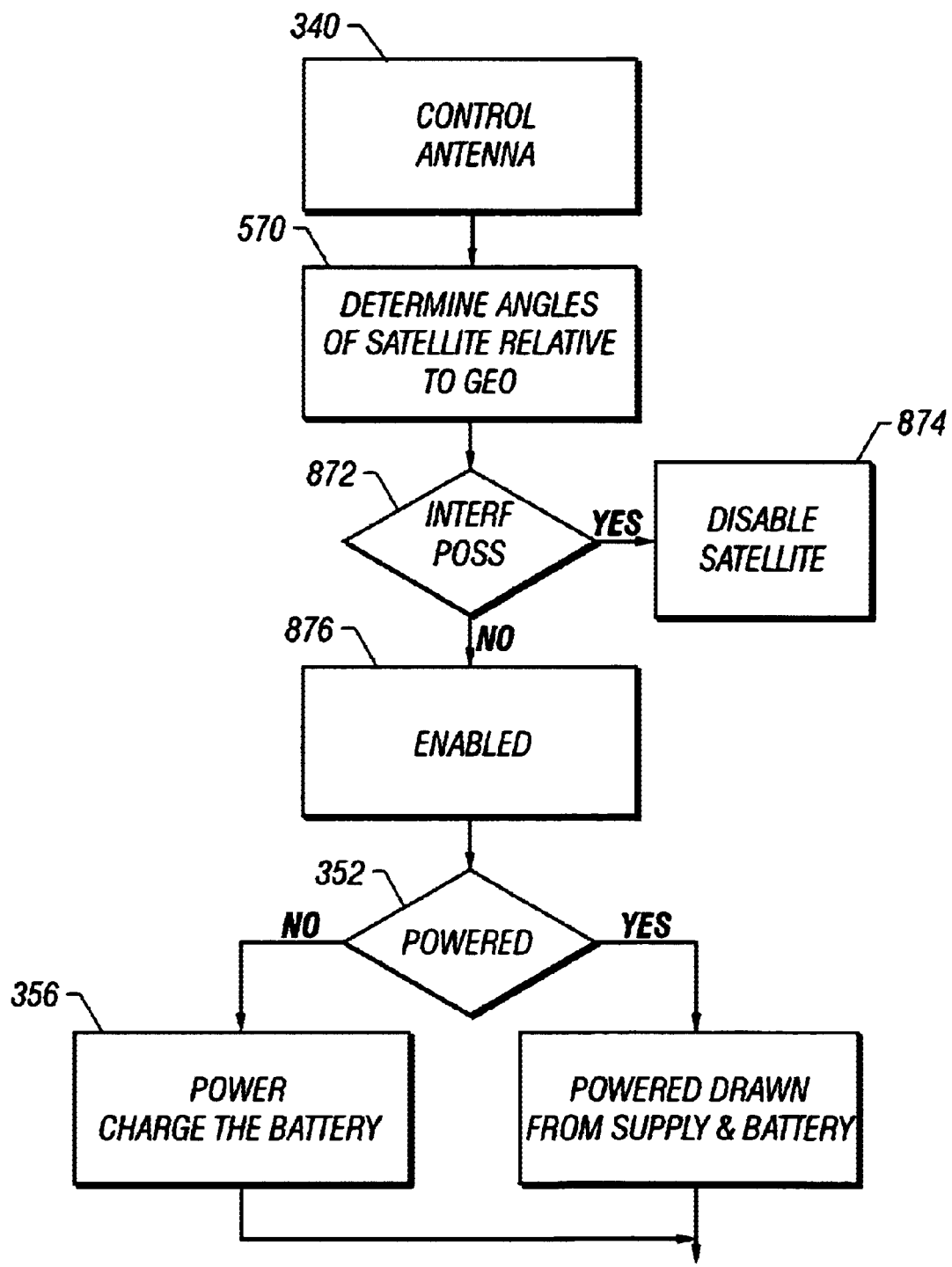
FIG. 2A shows a flowchart of operation of the satellites of the present invention.

The flowchart of operation is shown in FIG. 2a. Step 350 represents controlling the antenna. This requires that the processor keep track of the satellite's position in the orbit. Step 352 determines if the satellite is in a position in its orbit where it is active (transmitting and/or receiving). If so, flow passes to step 354 where power is drawn from power supply and the battery. If the satellite is not powered, then power is used to charge the battery at step 356.

The system also allows selective expansion of the communications coverage by adding additional satellites into additional elliptical orbits.

The virtual geo satellite system of the present invention also enables complete communications coverage of the earth without requiring a ground network. The same satellite services all different portions of the earth at different times of day. The coverage of the earth repeats over a 24 hour period. A preferred embodiment receives information relayed from the ground, relays it to the earth area below it, then stores the information, and later reads back the stored information to re-transmit that same information to other areas of the earth. The system of the present invention increases the satellite coverage at high density geographic locations using fewer satellites than was possible with previous constellations by fixing the satellite apogee passages over given geographic regions defined by both longitude and latitude.

Integral values for mean motion of the satellites in the array ensures that the ground track repeats on a daily basis. The ground tracks preferably repeat each day so that the orbit apogee passes in the same location relative to the geographic target area. This system maximizes the time of coverage and elevation angles for that pass.

Before describing the minimum satellite arrangement according to the present invention, the nomenclature used herein to describe the characteristics of satellite orbits will be first described. The "mean motion" is a value indicating the number of complete revolutions per day that a satellite makes. If this number is an integer, then the number of revolutions each day is uniform. This means that the ground tracks of the satellites repeat each day: each ground track for each day overrides previous tracks from the preceding day.

Mean motion (n) is conventionally defined as the hours in a day (24) divided by the hours that it takes a satellite to complete a single orbit. For example, a satellite that completes an orbit every three hours ("a 3-hour satellite") has a mean motion of 8.

The "elevation angle" $\delta$ is the angle from the observer's horizon up to the satellite. A satellite on the horizon would have 0° elevation while a satellite directly overhead would have 90° elevation. Geo satellites orbit near the equator, and usually have a 20–30° elevation angle from points in the United States.

The "inclination" I is the angle between the orbital plane of the satellite and the equatorial plane. Prograde orbit satellites orbit in the same orbital sense (clockwise or counter-clockwise) as the earth. For prograde orbits, inclination lies between 0° and 90°. Satellites in retrograde orbits rotate in the opposite orbital sense relative to the earth, so for retrograde orbits the inclination lies between 90° and 180°.

The "critical inclination" for an elliptical orbit is the planar inclination that results in zero apsidal rotation rate. This results in a stable elliptical orbit whose apogee always stays at the same latitude in the same hemisphere. Two inclination values satisfy this condition: 63.435° for prograde orbits or its supplement 116.565° for retrograde orbits.

The "ascending node" is the point on the equator where the satellite passes from the southern hemisphere into the northern hemisphere. The right ascension of the ascending node ("RAAN") is the angle measured eastward in the plane of the equator from a fixed inertial axis in space (the vernal equinox) to the ascending node.

The "argument of perigee" is a value that indicates the position where orbital perigee occurs. When using equatorial orbits, 0° argument of perigee is used for all the orbits. Inclined orbit arrays use non-zero arguments of perigee. Arguments of perigee between 0° and 180° locate the position of perigee in the northern hemisphere and hence concentrate the coverage in the southern hemisphere. Conversely, arguments of perigee between 180° and 360° locate the perigees to the southern hemisphere and hence concentrate the coverage on the northern hemisphere.

The preferred embodiment of the present invention evenly spaces the axes of the ellipses. The spacing between RAANs is called "S" and calculated by S=360/n=120°.

The present invention positions the satellite coverage based on both longitude and latitude of the desired continental area to be covered by the orbit. This is done, first, by synchronizing the orbit apogee to pass over the targeted geographical region for each successive satellite. We select a suitable value for the mean anomaly, which is a fictitious angle relating to the elapsed time in orbit. 360° represents the completion of the orbit. In this example, the mean anomalies are also S=120° apart.

This "mean anomaly" M relates the amount of time it takes the satellite to rotate S° around the earth (here 120°).

The mean anomaly required for the 12-hour satellites to rotate to S° is 8 hours; two-thirds of a period. This corresponds roughly to the amount of time the satellite remains in apogee.

Taking the initial satellite near apogee, therefore, (180° mean anomaly) the next satellite should be backed up by 240°. This means that after 8 hours that satellite will be at 180°. Since 180° minus 240° is negative 60° which equals 300°, this is the value of mean anomaly M for satellite number 2. This system is used to select values for the constellation in a similar manner for each succeeding satellite.

Arrays with more satellites ("higher order arrays") can also be made using the same rules as those discussed above. Successively larger numbers of satellites can be used to provide more coverage, more overlapping coverage, or smaller integral mean motion values. As the values of M get larger, the eccentricity of the ellipses become smaller. This is because the perigee altitude is fixed at about 500 km to avoid re-entry and decay into the earth's atmosphere; longer periods have higher apogee altitudes greater supportable eccentricities.

Figure 1A:
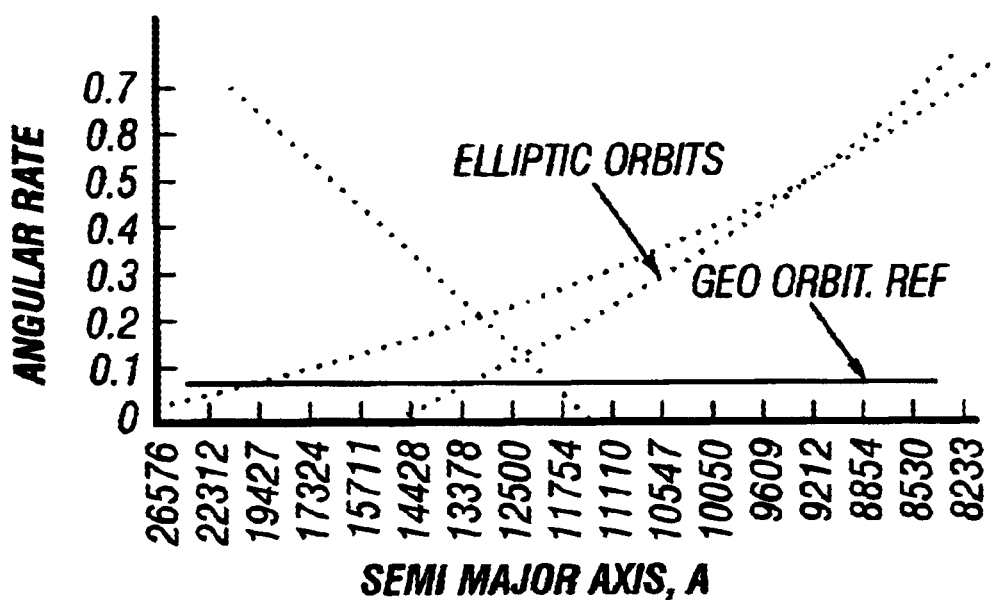
FIG. 1A shows a graphical depiction of the satellite's angular motion along its orbit as a function of the semi-major axis of the elliptical orbit.
Figure 1A:
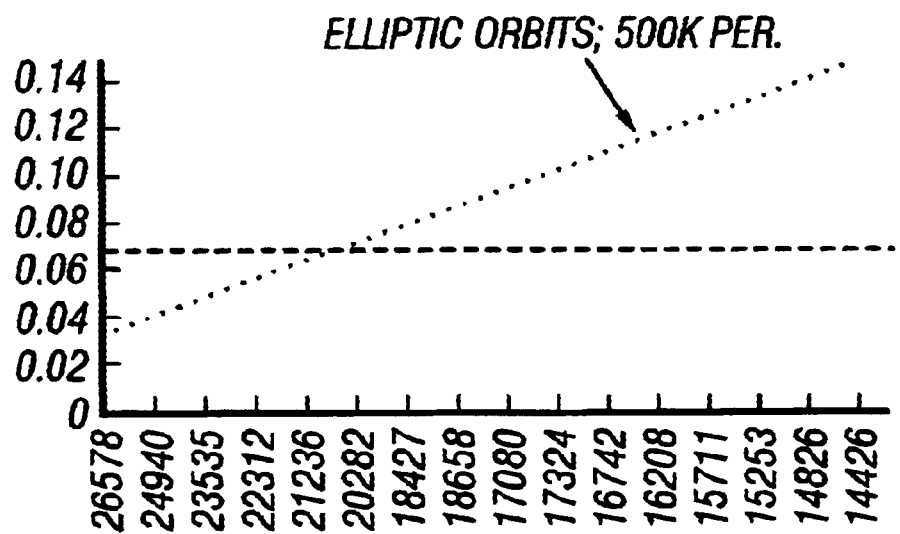

FIG. 1A shows how the satellite ellipse is selected to have an angular rate in the plane of the equator, at apogee, which approximates the angular rate of the earth. The dotted line in FIG. 1A represents the angular rate of a geo satellite, and hence at this angular rate a satellite would approximate the angular speed of the earth. The ellipse is selected to have a semi-major axis length to set the minimum angular rate of the satellite at apogee. At apogee, the satellite angular rate should approximate the rotational velocity of the earth. In reality, this rotational velocity will be either a little faster or a little slower than the earth. At this time, therefore, the satellite appears to hang relative to the earth.

All elliptical orbits, including those described herein, are also subject to effects of long-term perturbations. If effects of these long term perturbations are not compensated, this could cause continental coverage to drift with the passage of time.

These perturbation effects are mainly effects from the Earth's J2 rotation harmonic. The earth is not a perfect sphere; it actually bulges at the equator. This causes gravitational effects on objects which orbit the earth. For posigrade orbits (i>90°) the line of nodes will regress. For inclinations greater than critical (63.4°>i>116.6), the line between the perigee and apogee (line of apsides) will regress; for other inclinations, I<63.40° or I>116.6, the line of apsides will progress. Exactly at the critical angles I=63.4 or I=116.6, the line of apsides will remain stable a very desirable feature in maintaining apogee at a certain latitude. In the equatorial plane, the combined effect of these two major perturbations cause the apogee to advance or move counter-clockwise from the sense of looking down from the celestial north pole. All of the satellites in a given array design would be affected similarly. Fortunately, this effect could be compensated by slightly increasing the period of each satellite in the array by an amount which offsets the J2 perturbation. This affects the system by causing a point on the earth to take a slightly longer time to reach the satellite's next apogee arrival point. This effect is compensated by slightly increasing the satellite's period. The advance of perigee is suppressed by setting the inclination at one of the critical values.

A first embodiment of the invention uses N=3 satellites, where N is the total number of satellites, preferably in the equatorial plane, to cover N−1=2 continents. The rules for spacing and phasing the satellites will be given in the general form that can be used later for more complicated constellations or arrays.

The mean motion integer sets the minimum number of satellites in the array and $n_c$ the number of continents that are followed. Here $n_c$=2 provides a satellite period equal to 12 sidereal hours. N (the minimum number of elliptic satellites in the array) is determined by using the relationship N=$n_c$+1. Thus, N=3. This is the minimum number of satellites that need to be in the array; we can also set the number of satellites in the array N to be any integer greater than n+1.

The apogee passage is synchronized over the targeted geographical region, for each successive satellite, moving counterclockwise as viewed from the celestial North Pole. This is accomplished by selecting a suitable value for the mean anomaly.

Refinements: Additional features augmenting the usefulness of the above simpler version include:

1) Inclining the elliptical orbital planes at the critical inclination angles (63.435 or 116.535°), with phasing to maintain a single repeating ground track. The single repeating ground track for the simplified non-inclined example above is simply the line of the equator.

2) Taking advantage of the higher apogees in allowing more direct cross-linking between satellites than with present low-altitude circular arrays. Usually, a single cross-link suffices, even when the longitude difference between end points is 180° (on the opposite side of the earth).

3) Placement of apogees over a selected latitude and longitude for optimal coverage of a potential market area. This is done through proper selection of all the orbital parameters, with particular attention given to selection of argument of perigee, ω.

First Embodiment

The orbits of the present invention are shown in FIG. 1. The satellite 100 is shown in an elliptical orbit 102 around the earth. The communication equipment on the satellite 100 communicates with earth ground station 104, and also beams the information to earth ground station 106. Satellite 110 is shown in a separate independent elliptical orbit communicating with ground stations 112 and 114 on the earth. Note also that the satellite 100 can communicate directly to the satellite 110 via communication link 120.

The preferred characteristics of these orbits are described in Table I.

TABLE I

| Satellite No. | P1 | P2 | P3 |
|---|---|---|---|
| Semi-Major Axis, a = | 26553.98 km | 26553.98 km | 26553.98 km |
| Inclination, I = | 0 deg | 0 deg | 0 deg |
| Arg. Perigee, w = | 270 deg | 270 deg | 270 deg |
| Eccentricity, e = | 0.51 | 0.51 | 0.51 |
| Rt. Ascension, RAAN = | 0 deg | 120 deg | 240 deg |
| Mean Anomaly, MA = | 180 deg | 300 deg | 60 deg |

Satellite 100 also includes store and dump hardware thereon as described herein. This allows the satellite to obtain program information so that later in its orbit, when at the position 130, it can send its same information to ground station 132.

A detailed block diagram of the electronics in the satellite is shown in FIG. 2. This block diagram shows elements which carry out communication between the ground station 104, the satellite 100, and the remote user station 106. The inter-satellite links 120 are shown from the satellite 100 to the satellite 110.

The video input to be distributed is received as video input 200, and input to a video coder 202 which produces digital coded video information. This digital coded video is multiplexed with a number of other channels of video information by video multiplexer 204. The resultant multiplexed video 206 is modulated and appropriately coded by element 208 and then up-converted by transmitter element 210. The up-converted signal is transmitted in the Ku band, at around 14 GHz, by antenna 212. Antenna 212 is pointed at the satellite 100 and received by the satellite's receive phased array antenna 214. Antenna 212 is controlled by pointing servos 213.

The received signal is detected by receiver 216, from which it is input to multiplexer 218. Multiplexer 218 also receives information from the inter-satellite transponders 240.

The output of multiplexer 218 feeds the direct transponders 250, which through a power amplifier 252 and multiplexer 254 feeds beam former 256. Beam former 256 drives a transmit, steerable phased-array antenna 260 which transmits a signal in a current geo frequency band to antenna 262 in the remote user terminal 106. This signal preferably uses the same frequency that is used by current geo satellites. The phased array antenna is steered by an on-board computer which follows a pre-set and repeating path, or from the ground. This information is received by receiver 264, demodulated at 266, and decoded at 268 to produce the video output 270.

The satellite includes another input to the multiplexer from the steerable antenna, via the intersatellite link 120 and receiver 240. Transmit information for the the intersatellite link is multiplexed at 242 and amplified at 246 prior to being multiplexed.

Output 222 of input multiplexer represents a storage output. The satellite electronics include the capability to store one hour of TV program information. The TV channels typically produce information at the rate of 6 megabytes per second. The channels are typically digitally multiplexed to produce information on 4–6 channels at a time. Therefore, the present invention preferably uses 22 gigabytes of storage to store over 1 hour of information at about 4.7 megabytes per second. The information stored will be broadcast over the next continent.

The storage unit 224, accordingly, is a wide SCSI-2 device capable of receiving 4.7 megabytes per second and storing 22 GB.

Upon appropriate satellite command, the output of the storage unit is modulated and up-converted at 226.

This basic system shown in FIG. 2 can be used in one of the preferred satellite arrays of the present invention. These arrays will be discussed herein with reference to the accompanying drawings which show the characteristics of these satellite arrays.

This first embodiment uses a simplified 12-hour equatorial plane satellite array n=2, N=3. The mean motion n of 2 means that each satellite completes an orbit around the earth twice per day.

An important enhancement of an N=3 case is obtained by modifying the characteristics of the orbits so that the satellites coalesce over the covered areas at the moments when satellite coverage changes. The term coalesce as used herein means that as one satellite moves out of range of the ground tracking, the next satellite moves into range at that same position. In fact, the two satellites come very close to one another at that point—within 1° from the view of the satellite. This simplifies the ground tracking, since the switchover between satellites does not require much antenna movement.

FIGS. 4A–4F show the basic three-satellite "rosette" formed by the three elliptical orbits. The earth 300 is located at one of the foci of each of the three ellipses of the respective satellites. Satellite 302 communicates with point 304 on the earth. Satellite 302 orbits the earth in ellipse 306. The satellites 1, 2 and 3 respectively have ascending nodes of 0, 120 and 240, and respectively have mean anomalies of 180, 300, and 60.

Similarly, satellite 310 orbits the earth in ellipse 312, and satellite 320 orbits the earth in ellipse 322. Satellites 310 and 320 are both in a position to provide coverage to the second covered continent area 314. Note that satellites 310 and 320 are in their coalesced position—they are very close positionally, to one another. Satellite 320 is moving away from apogee while satellite 310 is moving toward apogee. The tracking antenna is hence commanded to switch between tracked satellites at the time when satellites 310 and 320 are positionally very close but having adequate angular separation to avoid self-interference. According to the present invention, this switchover occurs when the satellites are within 5° of each other.

The satellites all orbit in a counter-clockwise direction relative to the sense shown in FIG. 4. The earth also orbits in the counter-clockwise direction. The semi-major axes of the ellipses in FIG. 4 are shown as axes 308, 314, and 316, respectively.

Figure 3:
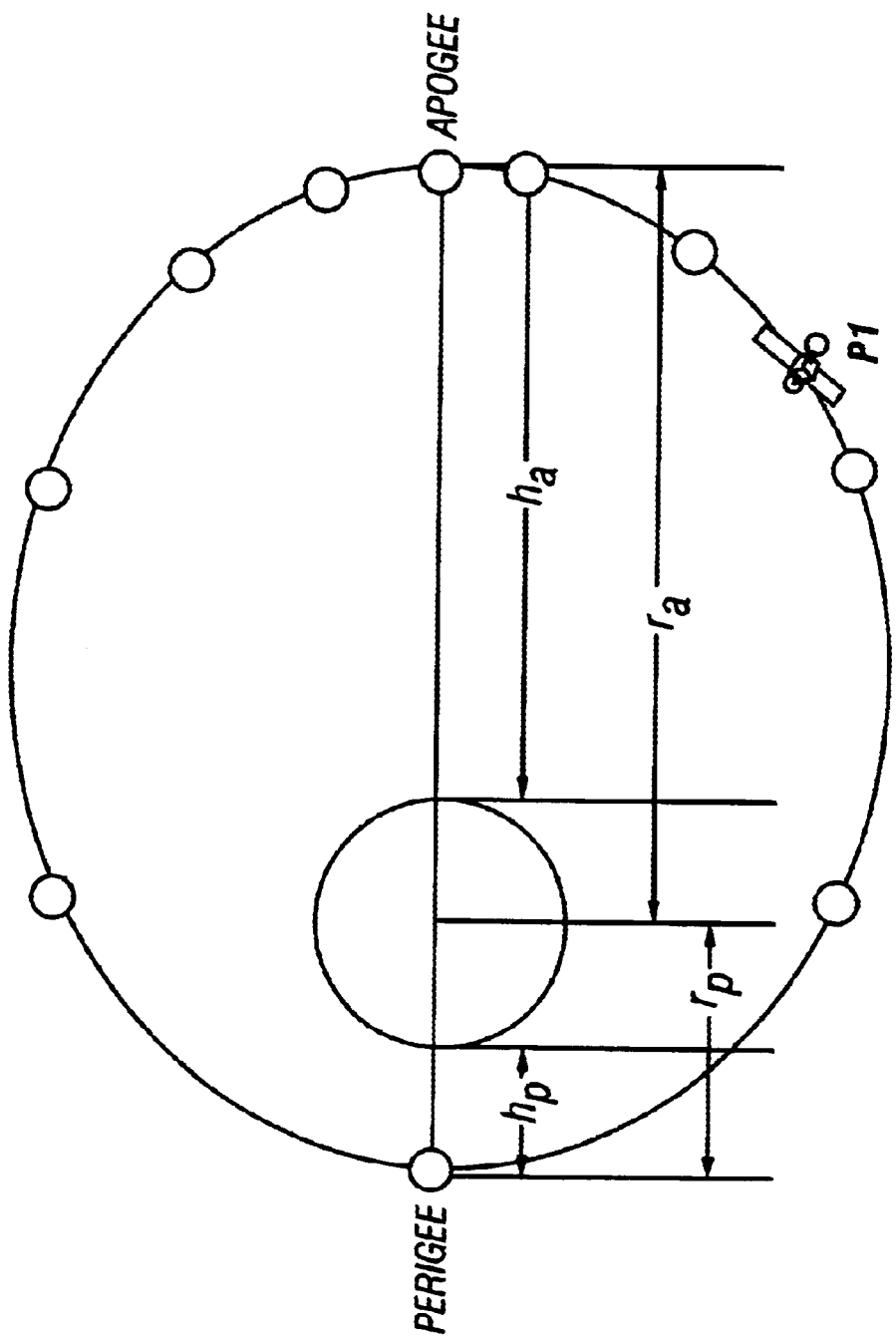
FIG. 3 shows the characteristics of a basic ellipse.

In order to describe these orbits, first the characteristics of an ellipse will be described. FIG. 3 shows ellipse 400, having a focus 402. The satellite orbits along the path of the ellipse 400, with the center of the earth being at the focus position 402 ("the occupied focus").

The apogee 404 and the perigee 406 of the orbits are defined by the points on the ellipse which are farthest from and closest to the focus of the ellipse, respectively. The amount of difference between these distances define the eccentricity of the ellipse. The semi-major axis 408 is defined as half of the long axis of the ellipse. This semi-major axis runs through the two foci of the ellipse, to split the ellipse into two halves. The two lengths along the semi-major axis, from one edge of the ellipse to the occupied focus of the ellipse are called the "radius of perigee" and the "radius of apogee"; the latter being the longer.

As the eccentricity of an ellipse approaches zero, the ellipse becomes less elliptical, eventually approaching a circle (e=0) when the eccentricity is zero. The semi-major axis of a circle is the radius of the circle.

The characteristics of the ellipse/object in elliptical orbit are calculated as follows.

The apogee, $r_a = a \cdot (1+ECC)$.

Perigee $r_p = a \cdot (1-ECC)$.

A more eccentric ellipse (higher value of eccentricity ECC) has a greater difference between the values P and R. Hence, such an ellipse is less like a circle. The characteristics of the ellipse are therefore determined as a function of its eccentricity.

The position of a satellite in orbit follows Kepler's laws of motion which states that the orbiting element will sweep out equal areas of the orbit in equal times. This results in the satellite moving very rapidly when it is at an approaching perigee, but very slowly when it reaches apogee. For a twelve hour elliptical orbit, therefore, it can be seen that the satellite will spend most of its time near apogee. The numbers on the ellipse of FIG. 3 represent time indications of hours passed in a 12 hour orbit, e.g., they indicate the number of hours since zero that have elapsed in a 12 hour orbit.

The preferred ellipse for the 3-satellite elliptical orbit has an eccentricity of about 0.51. This value best allows the satellites to coalesce.

Figure 4A:
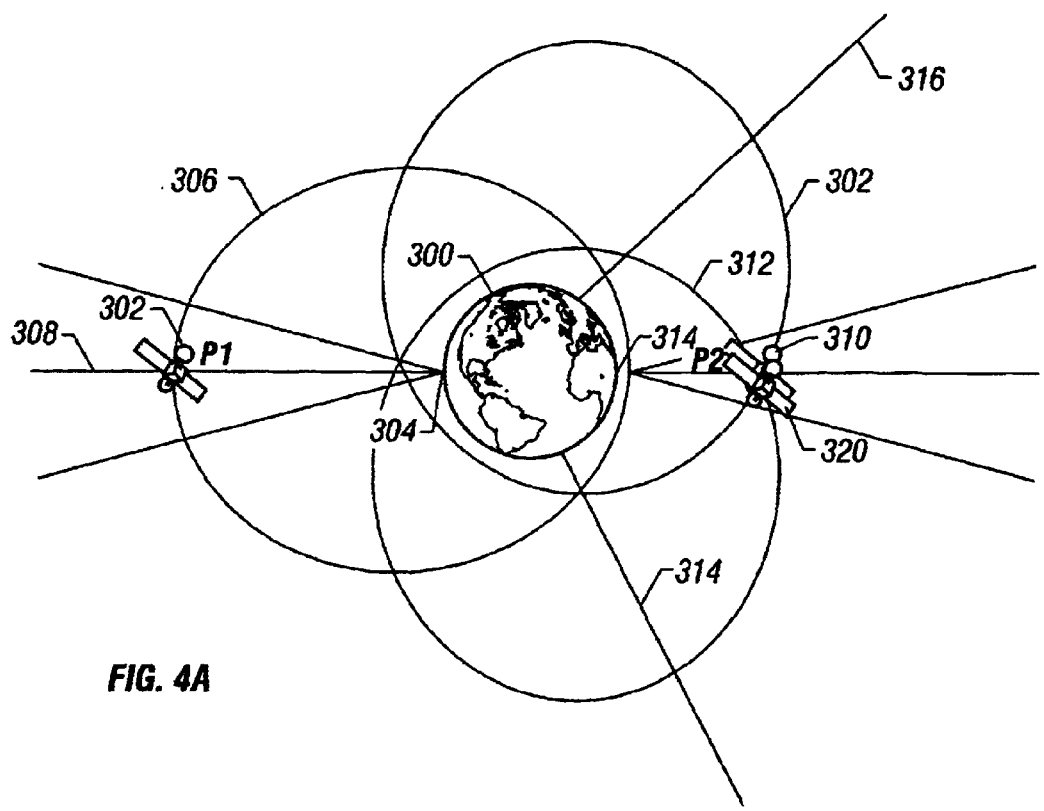
FIGS. 4A–4F show characteristics of the three-satellite orbit of the present invention.

The earth rotates once in every 24 hour period, and hence takes eight hours to rotate between the major axes of the three equally spaced ellipses (120° spacing). FIG. 4A shows the point to be covered 304 is initially pointing directly towards satellite 302 which is at apogee at time 0:00. As time passes, both the satellite 302 and the earth will rotate.

Figure 4B:
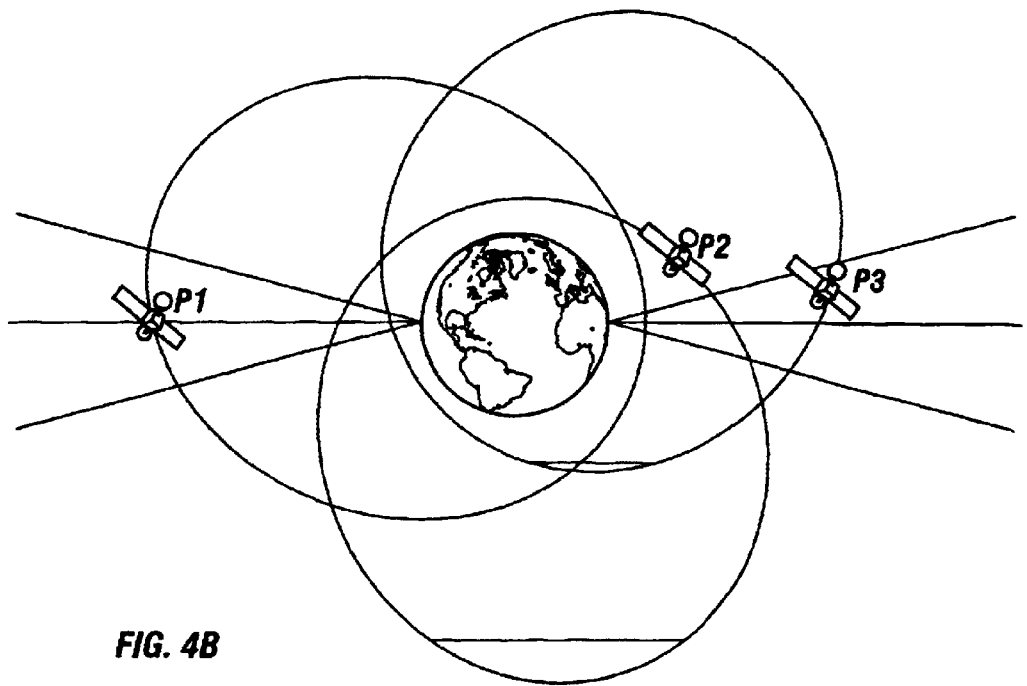

As time passes, the satellites move from the position shown in FIG. 4A. FIG. 4B shows the position one hour later at time 1:00. Satellite P1 has moved away from apogee, although it has moved relatively little. Satellite P2, on the other hand, is now moving much more rapidly at this time, since it is approaching perigee, while P3 is still near the apogee position.

An observer on or near the equator sees the nearest satellite appear to climb in altitude from almost directly overhead, towards apogee, all the while staying almost directly overhead at an elevation angle of 80–90°. The satellite is actually rotating more slowly than the earth during this time: it is appearing to move from east to west, rather than west to east as most low or medium altitude satellites move in the sky.

Figure 4C:
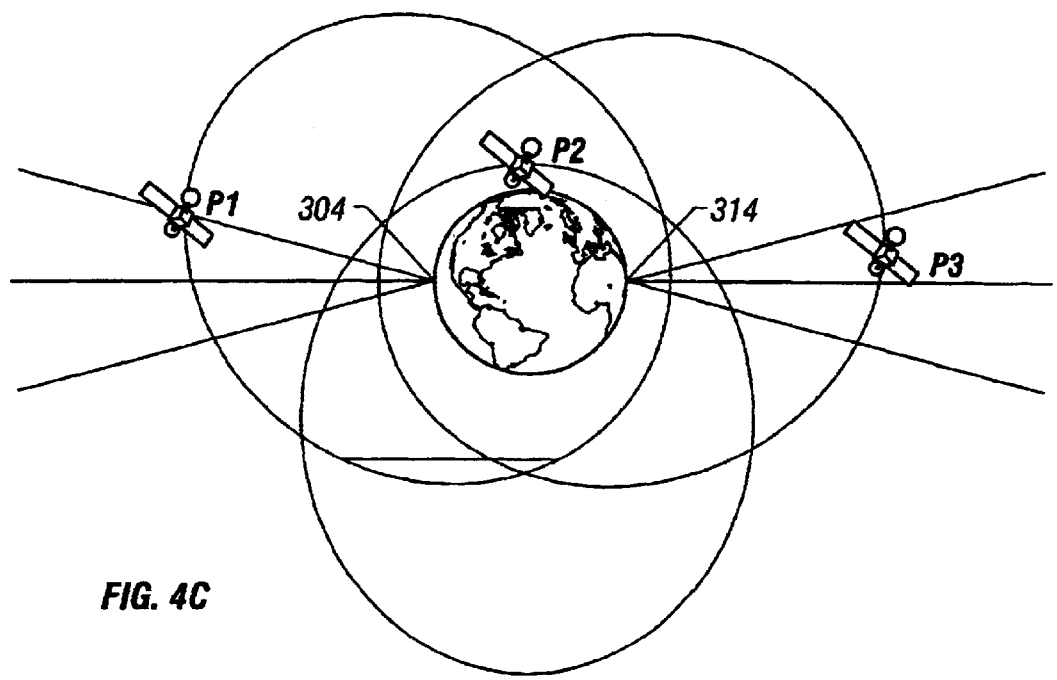

FIG. 4C shows a view of the satellites one hour later at time 2:00. The tracked locations 304 and 314 each still view a satellite near its apogee position. Satellite P3 continues to move towards apogee and hence appears to hang overhead. P1 is still around apogee and thus also appears to hover.

Figure 4D:
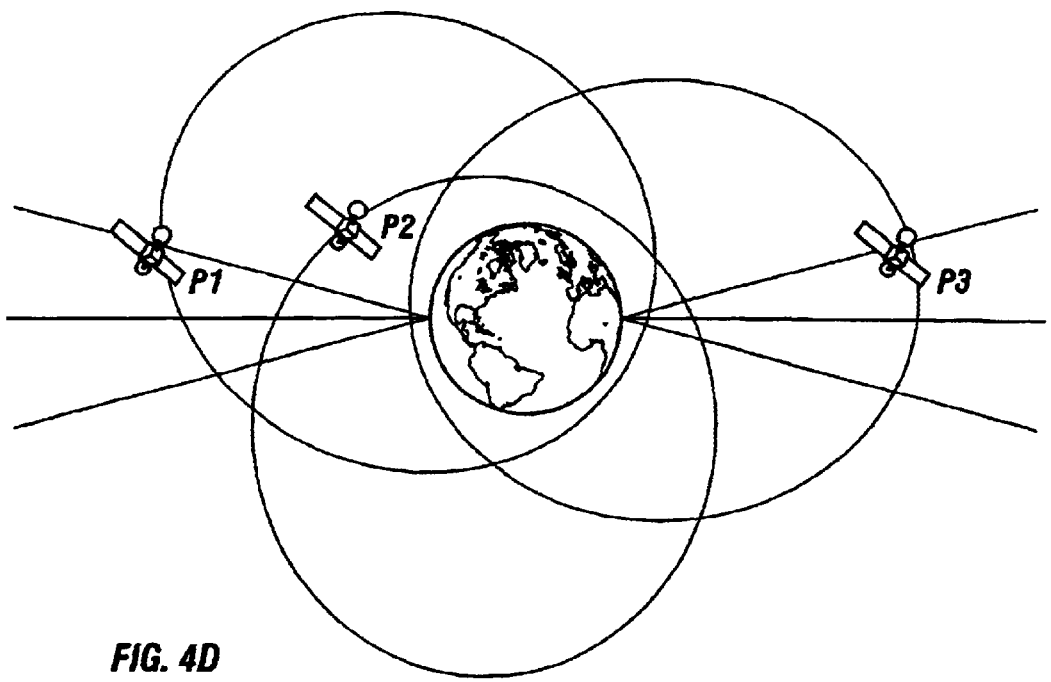
Figure 4E:
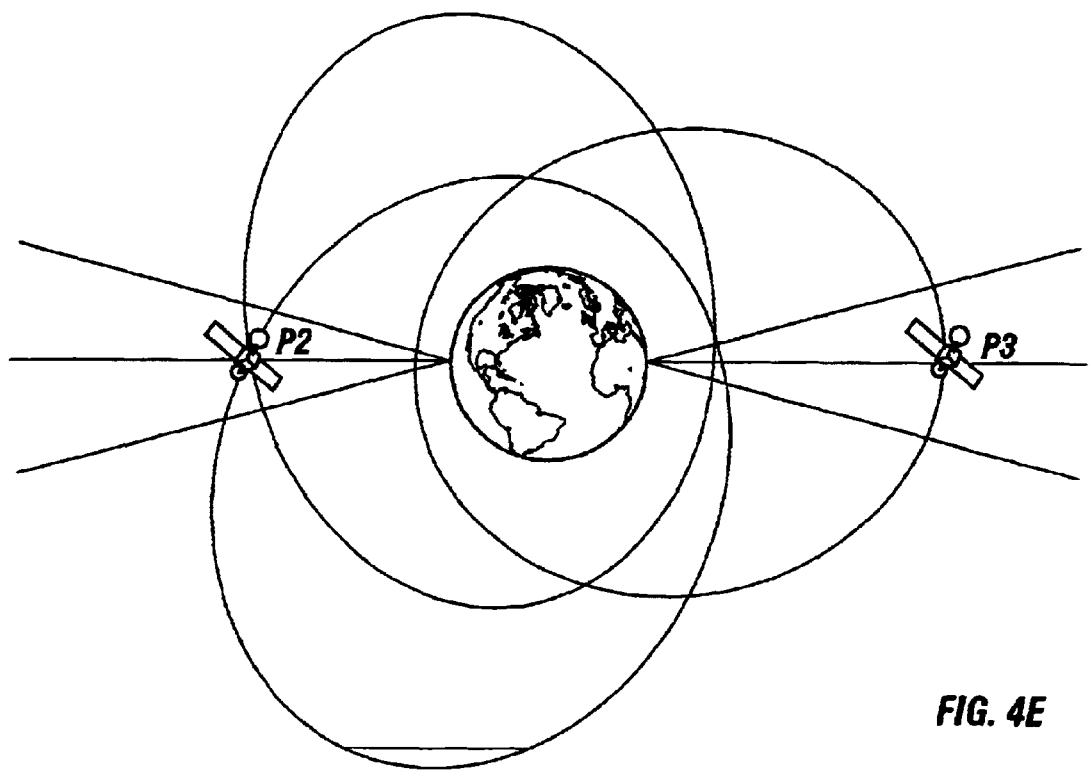

FIG. 4D shows yet another hour later at time 3:00. P3 is still at apogee, but P1 is approaching perigee. Notice that P2 is coming out of perigee and approaching the coalescence point at which P1 and P3 will cross paths. That crossing of paths is shown in FIG. 4E, time 4:00, when P1 and P2 have coalesced in their positions at the time when point 304 switches over between coverage by satellite P1 and P2. At that time, the satellites are within 1° of one another as viewed from the ground.

The above has described the satellite P1 moving from directly overhead the point to be covered, to the point where satellite P1 no longer covers the point to be covered. Therefore, the satellite is transmitting for eight of the twelve hours of its orbit; ⅔ of the time.

Figure 4F:
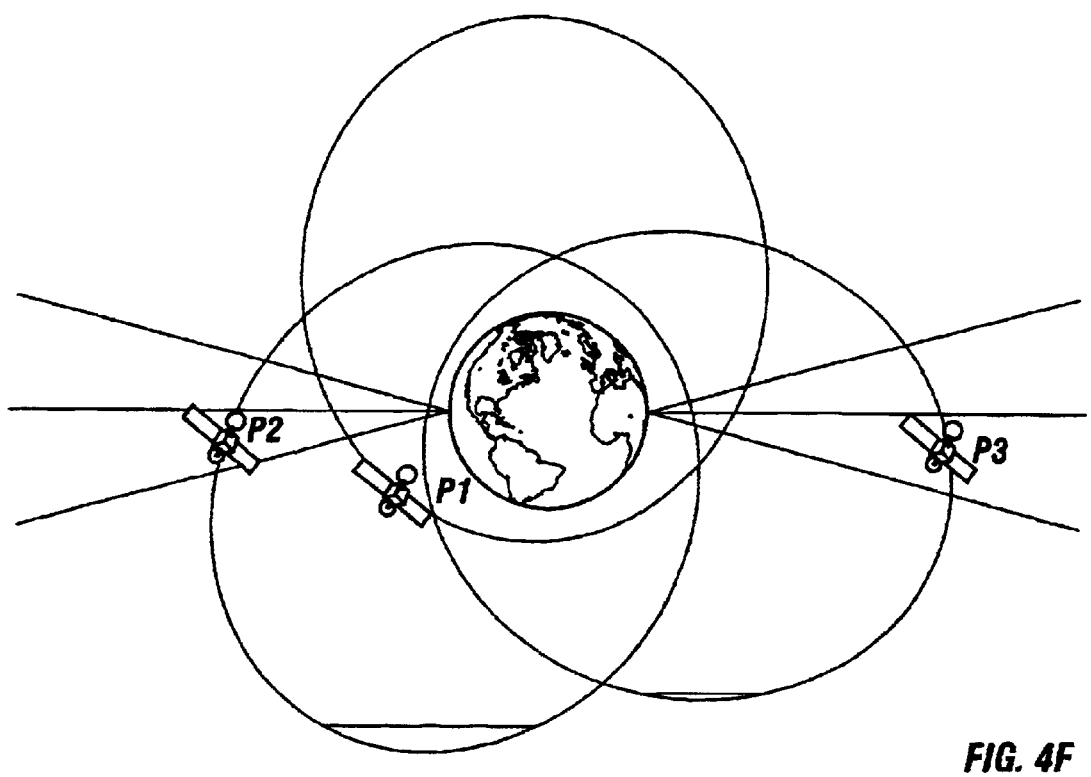

This cycle repeats. As the satellites continue to orbit, different satellites take similar positions to those shown in FIGS. 4A–4E. FIG. 4F shows the cycle starting to repeat with satellite P2 moving toward apogee, satellite P1 moving toward perigee, and P3 hovering relative to the earth near its apogee.

FIGS. 4A–4F demonstrate the important features recognized by the inventors of the present invention, whereby the satellites spend most of their time at apogee. At the highest points of apogee, the velocity of the satellite very nearly matches that of the earth, and so the satellite appears to hang overhead. The satellite is preferably tracked while its angular velocity differs from the earth's angular velocity by 20% or less.

Importantly, the covered areas on the earth always see either a satellite directly overhead or two satellites which are very nearly directly overhead. FIGS. 4A–4F show how this system actually appears to the communications point 304 to be virtually geosynchronous. The communications point communicates with different satellites at different times in the satellite orbit. The communications point is always communicating with one satellite.

The satellites follow repeating ground tracks, since the cycle of satellite movement shown in FIGS. 4A–4F continually repeats. Importantly, this allows the ground tracking antenna 212 to continually follow the same path, starting at a beginning point, tracking the satellite, and ending at the coalesce point. After the satellites coalesce as shown in FIG. 4A, the antenna begins its tracking cycle.

The inventors of the present invention have optimized this system for preventing interference with geo satellites.

Figure 4G:
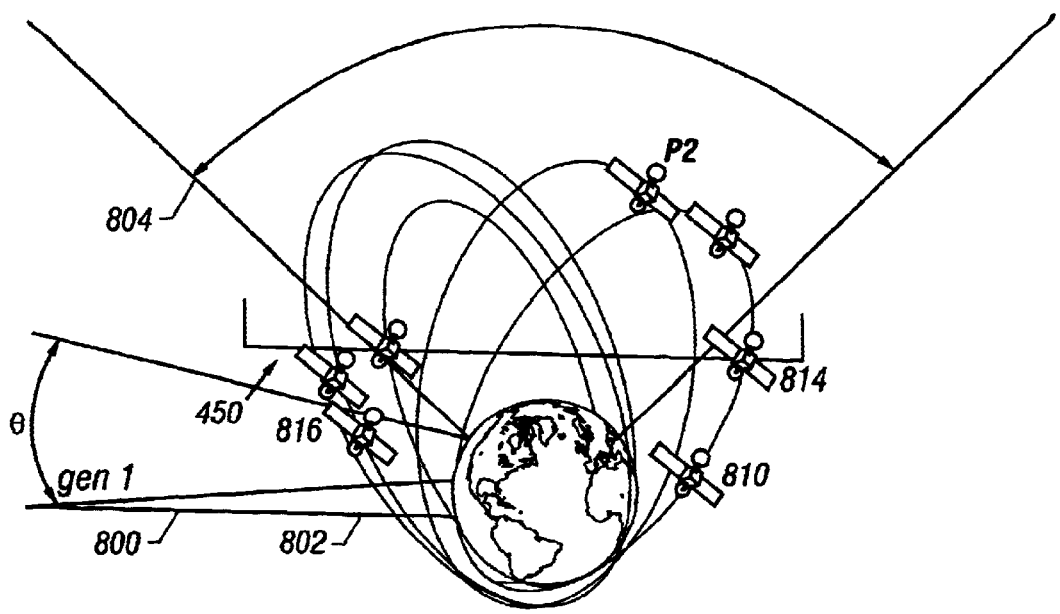
FIG. 4G shows characteristics of this orbit which prevent interference with geosynchronous satellites in an inclined orbit.

Specifically, consider FIG. 4G which shows a multiplicity of satellites in inclined elliptical orbits. The present invention preferably operates to monitor satellites at and near their apogee positions. The satellites near perigee are moving too rapidly, and hence are not tracked. More generally, the system of the present invention operates such that the satellites are only being used at certain times during their orbits. In this preferred embodiment, those certain times are when the satellites are at apogee. Non geosynchronous circular arrays are commonly used at present; they are actually much less efficient, since with zero eccentricity they spend a significantly greater time on the side of the earth away from the populated continents. The arrays of the present invention, on the other hand, spend most of the time at or near apogee over the populated continents of interest, and a relatively small time (at high angular velocities) passing through perigee in regions of no commercial interest.

The satellites are only used when their geometry is such that there is no possibility of the line of sight between the ground station and the satellite interfering with the geosynchronous band of satellites. This allows the satellite communication to take place on the same communication frequency band normally assigned to geosynchronous satellites.

Moreover, the present invention teaches that when the satellites are not communicating, either because the satellites are no longer at their tracked apogee portion and/or when the satellites are in a region where they might interfere with geosynchronous satellites, the main transmission is turned off. During this time, the power supply is used to charge the battery. This means that the power supply can be made smaller by some factor related to the duty cycle of the satellite.

Another consideration is since the satellites only communicate while near apogee, they are never eclipsed by the earth. The satellites can always receive sunlight for solar operation while transmitting and receiving.

For example, FIG. 4G shows satellites in orbit. In the example given in FIG. 4G, the satellites are only tracked when they are in the position of the orbit above the line 450. The only possibility of interference with geo satellites comes when the tracking beam is within 10° to 30° of the geo band. So long as an angular separation greater than this amount is maintained, there can be no interference. Therefore, the present invention allows reusing the frequency bands which are usually assigned to geosynchronous satellites in a position where interference with the existing satellites can not occur.

The same rules are used to construct higher order arrays with successively larger integer mean motions and hence shorter periods. These arrays require a larger number of satellites, but provide somewhat better coverage of the earth.

Since more satellites are used in these higher order arrays, each satellite need spend a lesser amount of its time at apogee. This allows orbits to be formed wherein the values of eccentricity are allowed to become smaller as the mean motion increases. The ultimate limit is atmospheric drag, which limits perigee altitudes to about 500 kilometers. This would correspond to a 1500 kilometer apogee elliptical orbit with a resulting eccentricity of $(r_a-r_p)/(r_a+r_p)$ which is approximately 0.067. This described orbit is not practical since its period is about 1 hour and 45 minutes which is not an integral value for the mean motion. The next nearest value for mean motion would be n=14. The n=14 orbit, however, would be so slightly elliptic that it would not offer much advantage over the circular orbits.

Practically, those arrays having mean motions of 3, 4, 5, 6, 7 and 8 are most preferred according to the present invention. The most preferred orbits according to this invention include the three-satellite orbits, the four-satellite orbits, and the five-satellite orbits. A particularly preferred embodiment uses two arrays of five satellite orbits.

As discussed above, all of these orbits include long-term perturbations which would, if not compensated, cause the desired continental coverage to drift off with the passage of time. The two major perturbation effects are due to the earth's $J_2$ harmonic; and include:

Regression of the line of nodes (for posigrade orbits), and
Advance of perigee.
For inclined orbits, the advance of perigee can be suppressed by setting the inclination, i, at either 63.435 or 116.565°.

The combined effect of these two major perturbations in the equatorial plane, due to the $J_2$ harmonic term has the net effect of causing the apogee to advance in a counter-clockwise direction looking down from the celestial North Pole.). All the satellites in a given array design would be affected alike. Fortunately, this effect can be compensated by increasing slightly the period of each satellite in the array in a way such that the earth takes a slightly longer time to reach the next satellite's apogee arrival point. This is compensated by adding this extra time to the satellites' periods. The exact amount will vary, and is a function of a number of variables, including the orbital periods, inclinations, and eccentricities.

For inclined elliptic orbits, there will be no rotation of perigee in either direction. However, there will be a regression of the line of nodes which must be compensated by a small adjustment in orbital period. This will cause the plane of the orbit to rotate clockwise in the sense looking down from the North Pole. If that happens, the satellite would pass over a selected meridian at a slightly earlier time each day (or each repeat cycle), unless we adjust the period of the satellite. In this case, we would shorten the period of the satellite, which effectively 'stretches' out the trajectory ground trace and causes the ground track to repeat exactly over the life of the satellite.

As described above, third order effects due to tesseral terms may need to be compensated by small orbit maintenance maneuvers using minuscule amount of fuel.

Figure 5E:
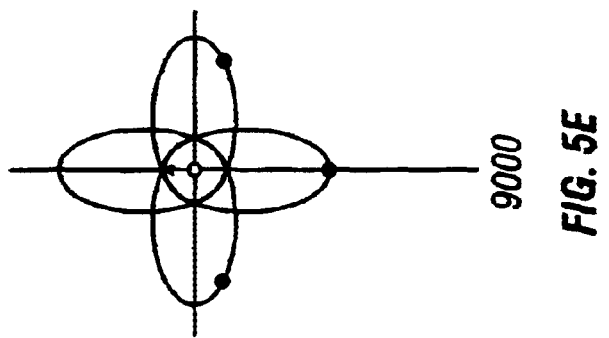
FIGS. 5A–5E show characteristics of the five satellite orbit of the present invention.
Figure 5D:
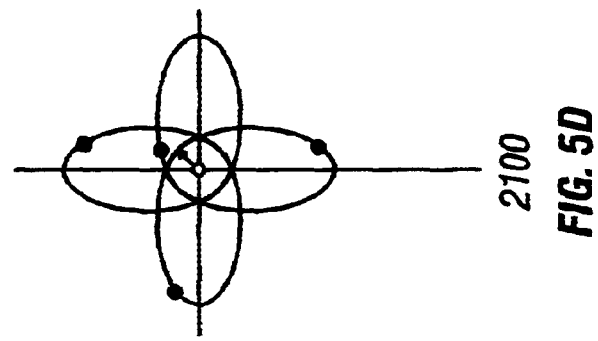
Figure 5C:
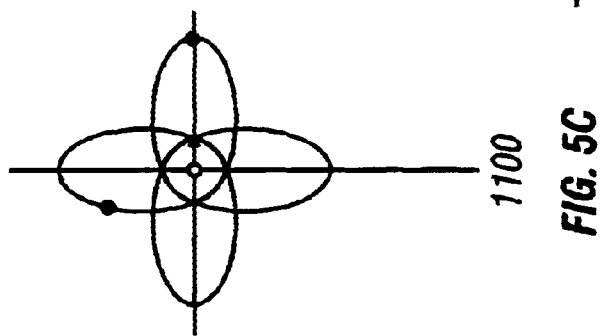
Figure 5B:
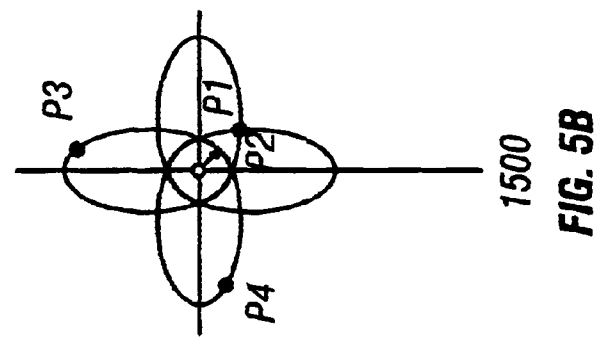
Figure 5A:
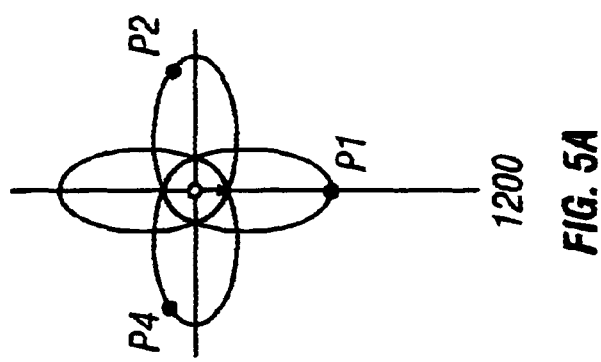

The preferred four-satellite array is shown in FIGS. 5A–5E. This array shows four satellites used to track three continents. These satellites orbit in elliptical orbits having an eccentricity of 0.6. FIGS. 5B and 5D show the satellite coalescing which occurs according to this preferred embodiment.

Figure 6:
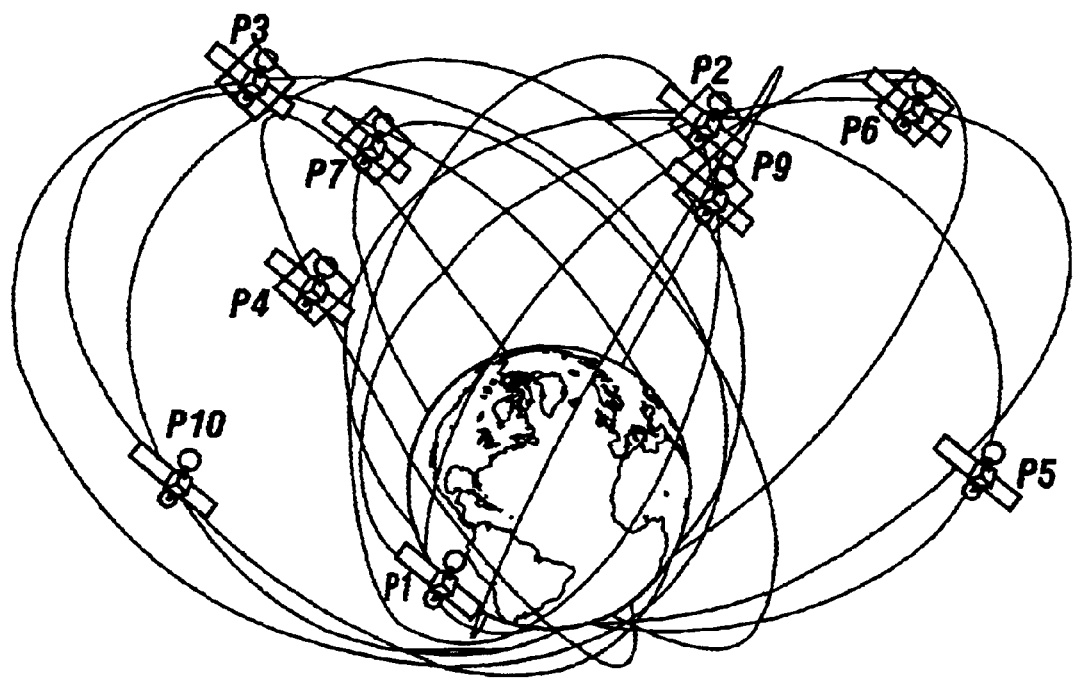
FIG. 6 shows an overall view of the ten satellite orbit of the present invention.

FIG. 6 shows an overall view of the 10 satellite array; and FIGS. 7A–7E show the ground tracks for a satellite array with 5 satellites having a period, T, equal to 6 hours. This array is preferably used with two sets of five satellites, yielding a ten-satellite, six hour constellation.

The preferred communications system uses a ten satellite system, each having six hour orbits, and each optimized for users in the Washington, DC area. This still, however, provides coverage throughout the rest of the continental United States, and the entire northern hemisphere as well as that part of the southern hemisphere down to about 10 deg South latitude.

The system uses ten equally-spaced prograde satellite orbit planes. All satellite orbits are at the 'critical' inclination angle of 63.435° to prevent rotation of the line of apsides.

The ground track is adjusted so as to pass directly over Washington, D.C. by adjusting the right ascensions of all the orbits while maintaining their equal spacing. The argument of perigee is adjusted to obtain apogees over or nearly over the targeted latitude and longitude.

FIG. 6 shows an overview of the orbital constellation. It can readily be seen that the satellites favor the Northern Hemisphere by spending more time, and reaching a higher altitude in the Northern Hemisphere. FIG. 6 shows a snap-shot of time at 0:00 hours, and it should be seen that all satellites except for satellites P5 and P1 are over the Northern Hemisphere at that time.

FIGS. 7A–7G show a Cartesian, or Mercator, plot of the world showing the repeating ground tracks. The satellite array has a repeating ground track that repeats every 24 hours. The satellites appear to 'hover' or dwell along four equally-spaced meridians, one of which is at the longitude of Washington, D.C.; the others being spaced at 90° intervals from Washington.

Figure 8:
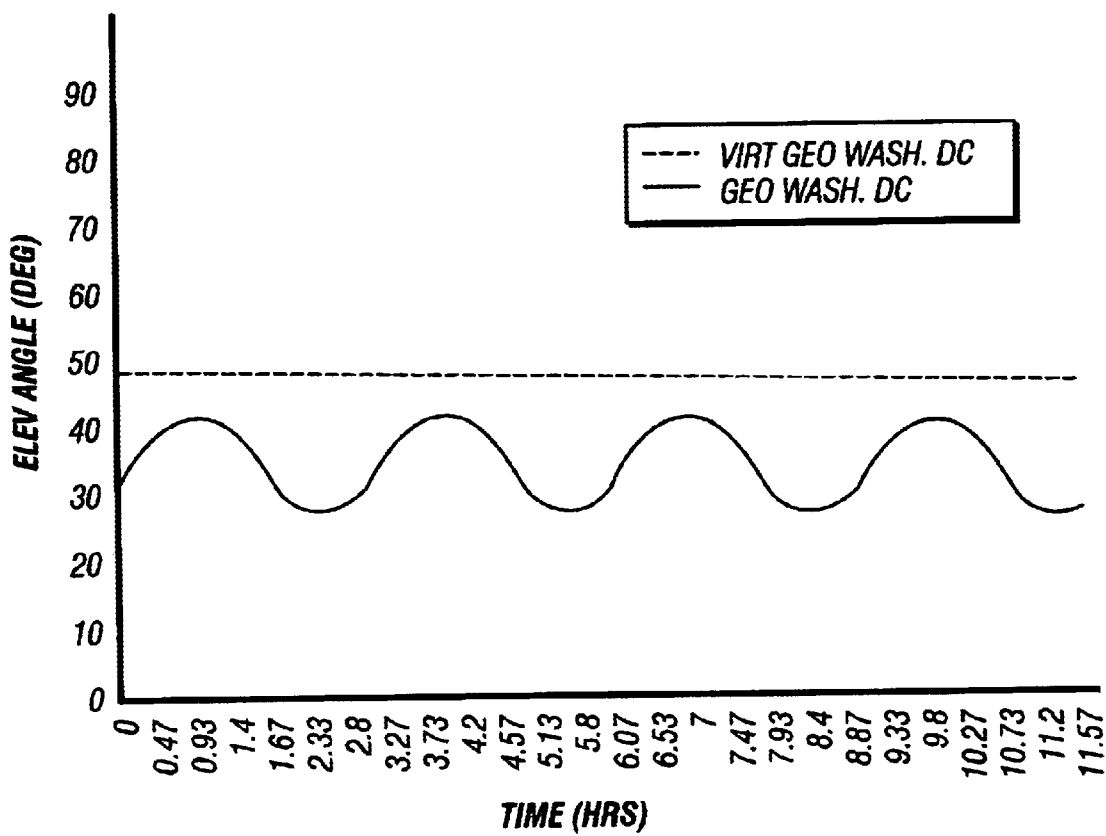
FIG. 8 shows the operating elevation angles for the ten satellite orbit, and their angular isolation from geo satellites.

FIG. 8 shows the minimum elevation angle to the highest satellite over Washington, D.C., as a function of time. Every 24 hour period has ten elevation angle peaks of satellites on a descending (from north proceeding towards the equator) at or near the observer's zenith (90 deg). The lower, sharper peaks in the figure represent other satellites on ascending passes; they are at lower altitudes and thus going faster. These ascending satellites are not actively transmitting to users on the ground at the times when they are on ascending passes.

The preferred system uses a total of ten (10) satellites in critically-inclined (i=63.4 deg) 6-hour orbits, phased and oriented to provide optimal earth coverage. As will be seen, this geometry also provides a very high elevation angle, and hence avoids interference with the existing geo communications satellite band. The preferred orbits have apogee and perigee altitudes of 20074 and 654 kilometers, respectively.

From a user's viewpoint, the satellites are accessed sequentially at nominal 2 hour and 24 minute intervals at exactly the same point in the northwestern sky (the 'start point' of the tracking segment), and are tracked in a roughly northwest to southeast trajectory to a point in the sky well short of intersecting the geo band of satellites. The satellites remain at apogee during the time while they are being tracked from the ground. Hence, these satellites are only tracked, and communicated with, while their velocity closely matches the velocity of the earth. When the satellites begin to approach the perigee stage, and hence their-velocity increases relative to the earth's rotation to differ therefrom by more than 25%, for example, they are no longer being tracked by the communication equipment on the earth. At this end point of the tracking segment, the ground communications antenna is directed back to tracking its start point to repeat the sequence as the next-appearing satellite is acquired. Tracking along the active arc segment is accomplished at less than 2 deg/min. For the present array, this results in every ground communications antenna effecting ten switchovers per day. As explained above with reference to FIG. 1, the steering operation of the present invention preferably uses phased array steering of the antenna. However, more-conventional antenna steering is also contemplated.

Importantly, the trajectory segments appear exactly the same to the user for every satellite, since the azimuth-elevation trace is repeated for each satellite.

This system defines significant advantages. Its operating altitudes are half that of existing geo systems. This greatly reduces link margins and emitted power requirements for the satellites.

Apogees are placed on the meridians of longitude of the heavily-populated areas for which the constellation is optimized. Apogee points may also be adjusted to approximate the targeted area latitudes as well. The satellite tracking arcs over the targeted areas remain roughly overhead (within 30–40° of zenith), with slow angular movement during periods when the satellite is active. The trajectories for mid-latitude (20–50° North latitude) observers located directly under the apogee points in the high-population targeted areas are approximately north-south oriented.

All ten ground tracks are identical, and only the satellite that is currently covering the repeating ground tracks change. The repeat cycle is 24 hours. Since the satellites move from one geographic area to another, information once transmitted can be re-broadcast at another location.

The Mercator plot of FIGS. 7A–7E show that the entire system actually follows one ground track, repeating after 24 hours. It actually 'folds over' from the left edge of the world map to the right edge, giving it the appearance of multiple traces.

Table II gives the orbital parameters, or ephemerides, of the entire array of ten satellites:

TABLE II

SYSTEM ORBITAL PARAMETERS

| Sat # | a (km) | i (deg) | e, (ecc.) | w, (deg) | RAAN (deg) | MA (deg) |
|---|---|---|---|---|---|---|
| 1 | 16742 | 63.435 | 0.58 | 315 | 0 | 0 |
| 2 | 16742 | 63.435 | 0.58 | 315 | 072 | 072 |
| 3 | 16742 | 63.435 | 0.58 | 315 | 144 | 144 |
| 4 | 16742 | 63.435 | 0.58 | 315 | 216 | 216 |
| 5 | 16742 | 63.435 | 0.58 | 315 | 288 | 288 |
| 6 | 16742 | 63.435 | 0.58 | 315 | 180 | 0 |
| 7 | 16742 | 63.435 | 0.58 | 315 | 252 | 072 |
| 8 | 16742 | 63.435 | 0.58 | 315 | 324 | 144 |
| 9 | 16742 | 63.435 | 0.58 | 315 | 036 | 216 |
| 10 | 16742 | 63.435 | 0.58 | 315 | 108 | 288 |

Some adjustments will be required to account for long term orbital perturbations as described above. This adjustment is common in satellites requiring precise repeat cycles such as Topex-Poseidon, or the Canadian Radarsat.

Similar views to those from the above can be drawn for the preferred ten-satellite array. An important point of the ten-satellite array, moreover, is that there is good inter-satellite connectivity for cross-linking.

Figure 7A:
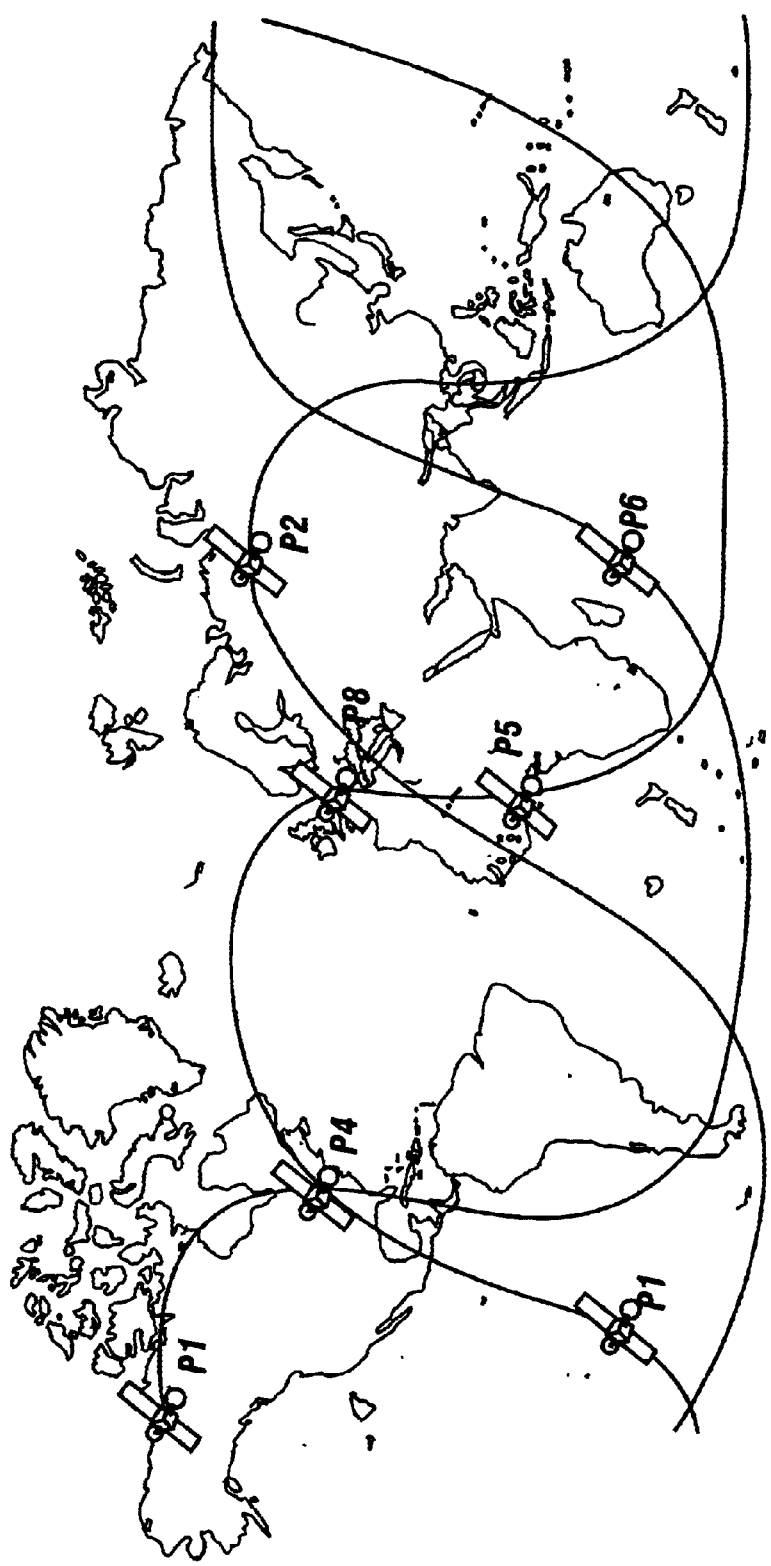
FIGS. 7A–7G show the positions of the satellites of the ten satellite embodiment within their repeating ground tracks.
Figure 7B:
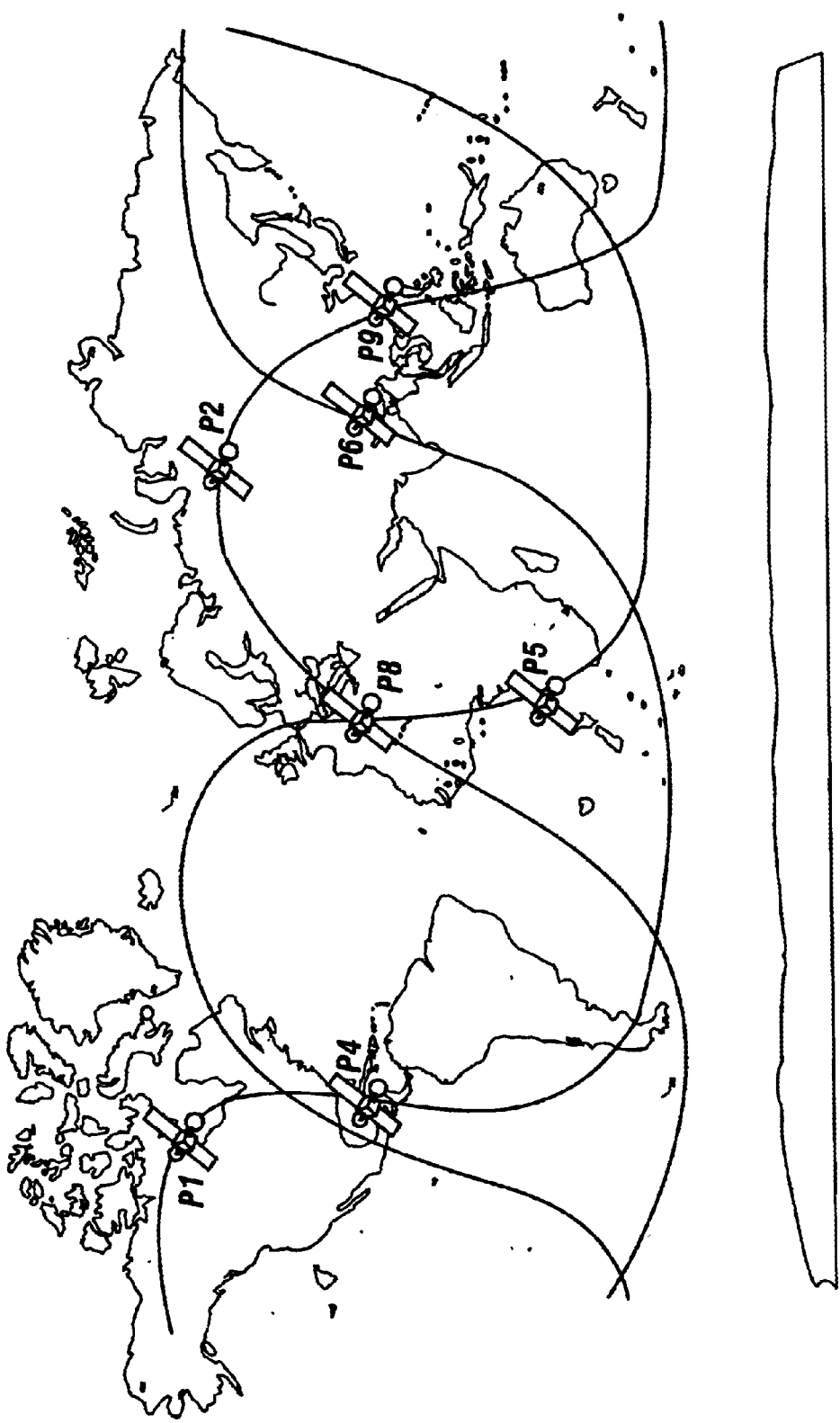

FIG. 7A shows the position of the satellites at time 00:00. Compare this with FIG. 7B, which shows the same satellites twenty-four minutes later. The satellite P4, which is substantially over Washington, D.C., has moved very little, albeit P5 will be picking up speed as it approaches perigee. P4 appears to hang over Washington, D.C., since it is near the apogee portion of its orbit and its velocity very closely matches the velocity of the earth.

Figure 7C:
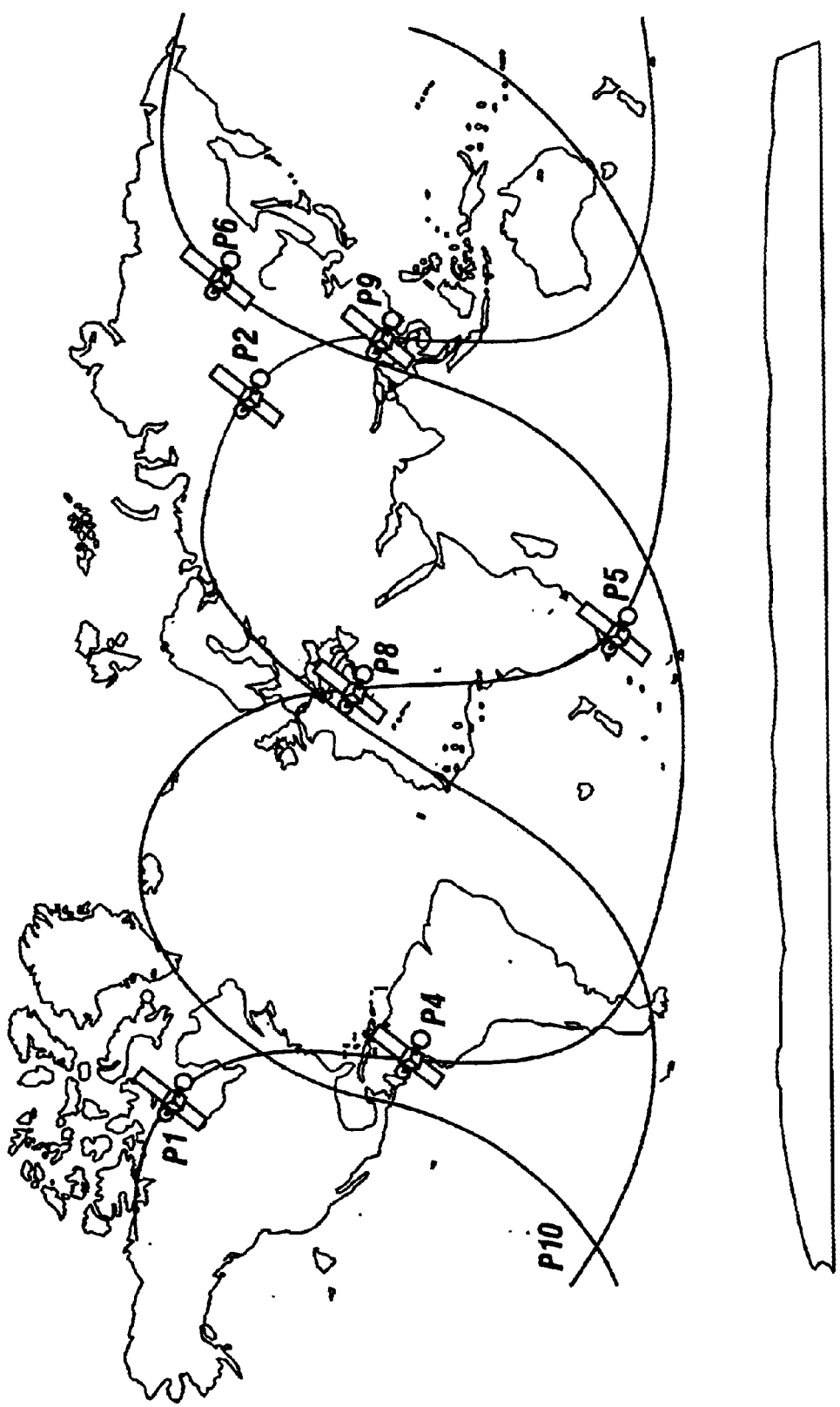
Figure 7D:
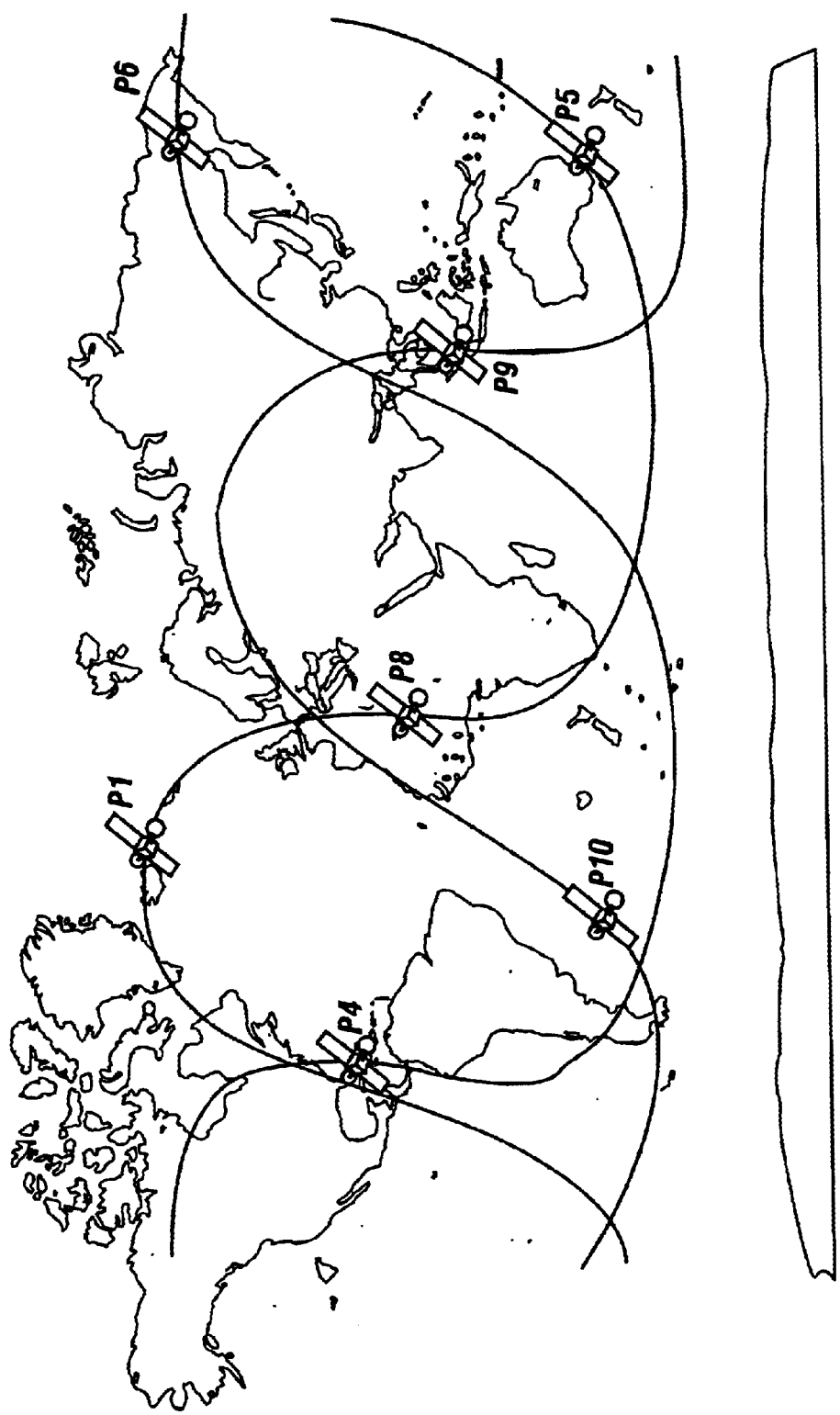
Figure 7E:
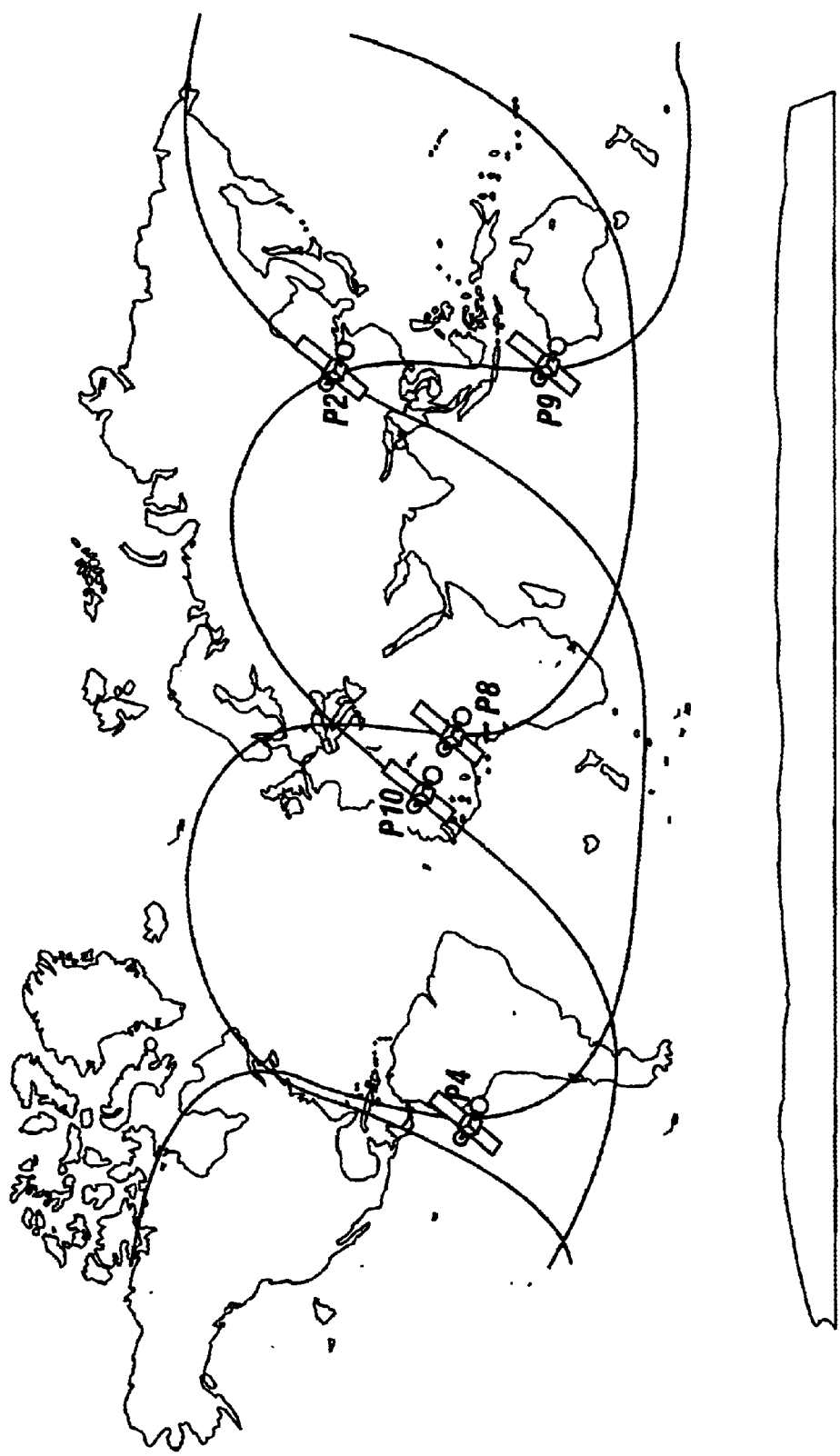

In contrast, during the same short period of time, the satellite P1, at perigee, has moved very quickly and very far along its orbit. Similarly, satellite P8 (over Europe), P5 (over Southern Africa) and P9 have moved very little. Twenty-four minutes later, FIG. 7C shows that satellite P4 has started to move away from the United States, but satellite P7 is now in place, very close to its apogee. This is evident from its position twenty-four minutes after that, shown in FIG. 7D, where satellite P7 has moved only very little, and is still well-covering the United States. At time 1:36 shown in FIG. 7E, the satellite P7 is over Washington, D.C.

Figure 7F:
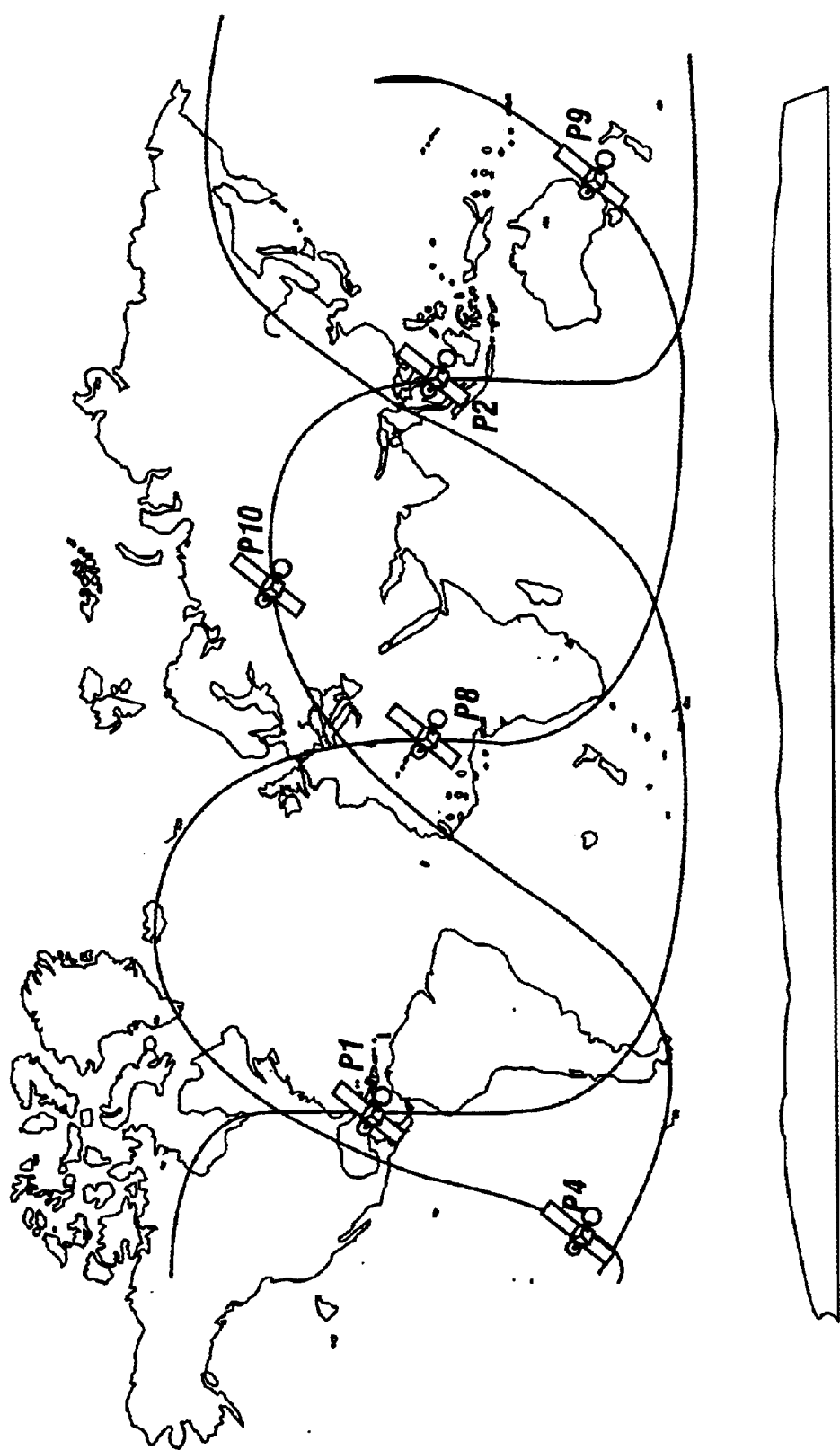
Figure 7G:
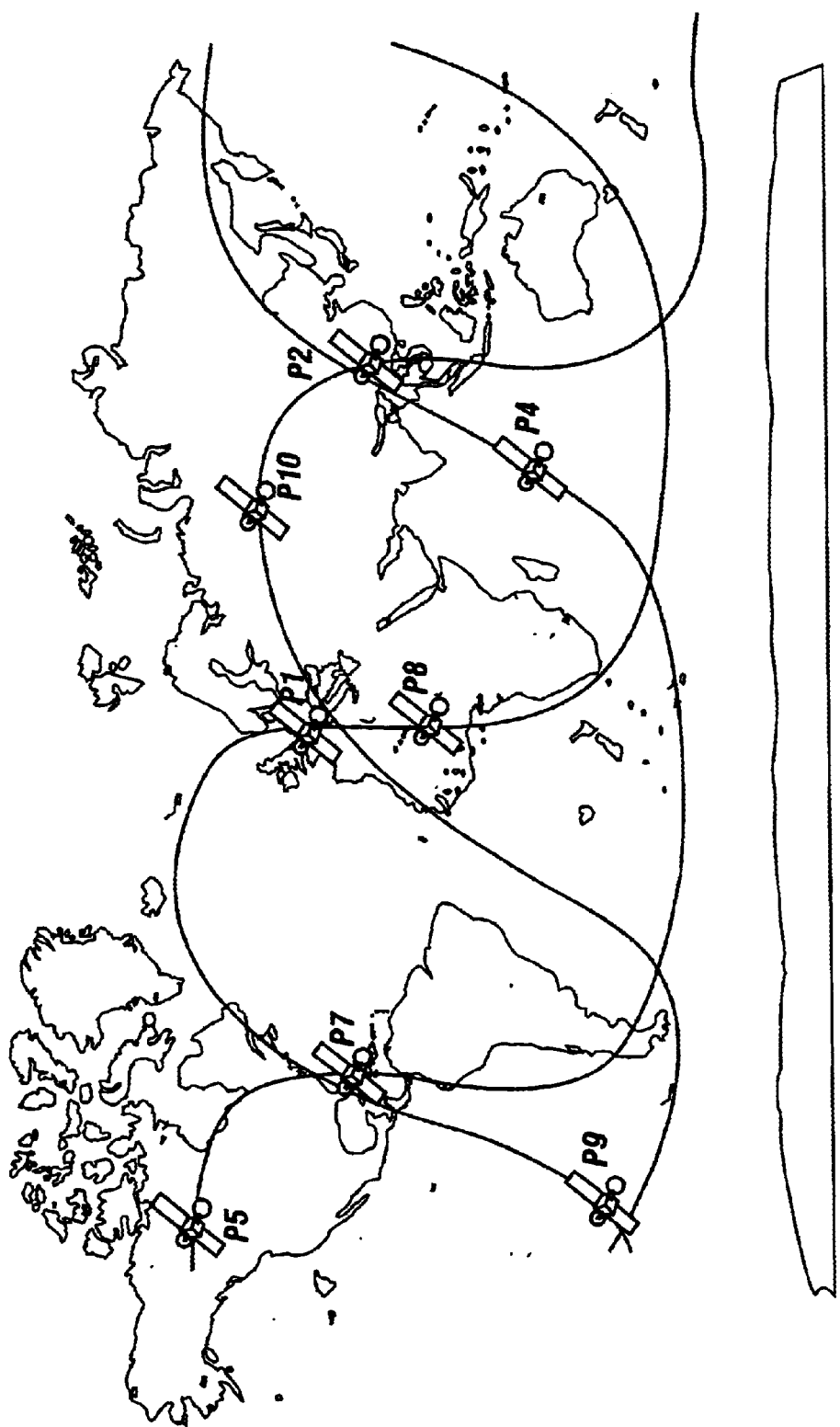

The satellite P7 is still over Washington D.C. at time 2:00 hours, shown in FIG. 7F. The satellite starts to move at time 2:24, shown in FIG. 7G.

The present invention intends that the satellites be used for communication during only some part of the time while they are in orbit. During other times in orbits, the satellites are not being used for communication, but instead are charging their energy storage. This feature of the invention has been described above, but will be described in more detail herein with reference to FIGS. 2A, 4G and 4H.

FIG. 4G shows a view of the earth from, for example, the view of the satellite from the sun. This figure shows all of the satellite orbits, and their elliptical orbital paths. The geo-synchronous satellites are in equatorial planes shown as the geo ring 800. Communications equipment on the earth communicates with this geo ring 800. Moreover, sometimes the geo satellites are perturbed by the earth's oblateness, hence effectively forming orbits which are slightly inclined. The geo rings should therefore be considered at occupying a 5° position bordering their nominal position.

Ground communications equipment on the earth communicates with this geo ring. The cone of communications to the geo ring is shown as 802.

When the ground communication equipment on the earth communicates with the satellites P1–P5, it should be seen that they are aimed at a position of the sky, 804, which is completely separated from the geo ring 802. According to the present invention, a distance is maintained between the satellites and the geo ring 800. The angular separation θ is the minimum acceptable angular separation which can ensure no interference between the geo ring and the satellites of the present invention. The preferred embodiment uses an angular separation of 300, which is an amount which will obviate any possibility of interference problem. More generally, however, any angular separation greater than 15° would be acceptable.

Taking the satellite P3 as an example, therefore, the satellite can only be used according to the present invention when it is in its orbit between the points labelled 808 and 810. However, the virtual geo system which is preferably used according to the present invention uses these satellites during even less of their orbit, only between the points 812 and 814. When the satellite is in the other positions of its orbit, the satellite is not consuming power or transmitting. Therefore, this prevents any possibility of interference with the geo satellite systems.

Figure 4H:
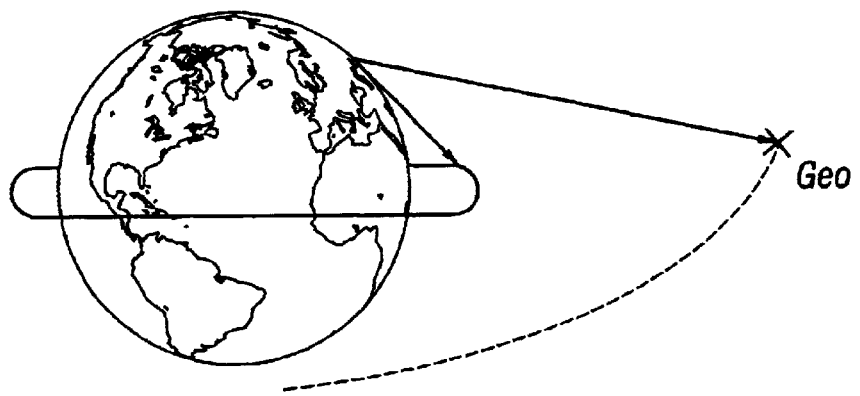
FIG. 4H shows characteristics of this orbit which prevent interference with geosynchronous satellites in an equatorial orbit.

The operation of the equatorial satellites is similar. The equatorial satellite array is shown in FIG. 4h. The equatorial satellite is shown as satellite ring 850. If the ground station is on the equator, shown as ground station 852, then it would, at least at some times, interfere with satellites in the geo ring shown as 854. However, if the ground station is separated from the equator by at least 30°, such as shown as position 856, then at least part of the satellite ring has no chance of interference with the ring 854. Therefore, the satellite calculates geometries such as to obviate interference with the satellite ring.

Therefore, more generally, the present invention operates as shown in FIG. 2a. The antenna is controlled at step 350, and from the antenna control the position of the satellite relative to geo are determined at step 870. This can be determined, for example, from the pointing angle of the antenna. Step 872 determines if there is any possibility of interference between the two. This is determined from a numerical difference between the pointing angle and the position of the geo ring. If there is any possibility of interference, control passes to step 874 where the satellite communications is disabled. If interference is not possible at step 872, then the satellite is enabled at step 874. An enabled satellite can be, but is not necessarily, turned on. For example, in the virtual geo embodiments, the enabled satellite will be maintained in the "off" position during some of the time when it is enabled. Therefore, step 352 determines if the satellite is powered. This may be determined from the repeating ground track, or other information. If the satellite is not powered at step 352, the battery is charged at step 356. If the satellite is powered, then power is drawn from both the supply and the battery at step 354.

Although only a few embodiments have been described in detail above, many modifications are possible in the preferred embodiment without departing from the teachings thereof.

The above has described baseline arrays with simplified orbital elements. It should be understood that the actual array may be rotated east or west by any desired amount by adding or subtracting a constant angular offset to each satellite's right ascension (RAAN). Additionally, other orbital parameters such as argument of perigee ($\omega$) may be adjusted to improve performance a different market area.

All such modifications are intended to be encompassed within the following claims.

What is claimed is:

1. A method of communicating between satellites in orbit and a ground station on the earth, comprising:
   determining N high-density geographic locations on the earth where N is at least 2;
   determining both longitude and latitude of said N high-density geographic locations;
   obtaining N+1 separate satellites in elliptical orbits with specified parameters; and
   fixing apogee passages of said satellites so that each of said N high-density geographic locations, at all times, is associated with one of said satellites in apogee over both longitude and latitude of said each geographic location.

2. A method as in claim 1 further comprising using integral values for mean motions of said satellites to allow the ground track to repeat daily.

3. A method as in claim 1 wherein said satellite is in an inclined elliptical orbit with an inclination of 63.4°.

4. A method as in claim 1 wherein there are three satellites in the constellation, and said three satellites cover two continents.

5. A constellation of satellites, comprising;
   a plurality of (N+1) satellites in elliptical orbits, where each elliptical orbit has an apogee and a perigee, and each apogee is substantially selected to have an angular rate which approximates an angular rate of the earth is rotation so that said satellite appears to be virtually geosynchronous at apogee;
   said arranged orbits such that one of said apogees is synchronized over a targeted geographical region, such that each of N geographical regions is always being covered by one of said N+1 satellites; and
   communicating to each of said geographical regions using said satellites which are at apogee.

6. A constellation as in claim 5 wherein said targeted geographical regions are regions of high population concentration.

7. A constellation as in claim 5 wherein there are three satellites, and the orbits are selected such that satellites come within 1 degree of one another at a point when one satellite moves out of range of the ground tracking and the other satellite moves into range of the ground tracking.

8. An apparatus as in claim 7 wherein the satellites respectively have ascended nodes of 0°, 120°, and 240°, and mean anomalies of 180°, 300°, and 60°.

9. A constellation of satellites in orbit, wherein there are N satellites, each satellite in a different elliptic orbit, said elliptic orbits being lower than that necessary for geosynchronous orbit, and each having an apogee portion which is selected to follow a specific continent on the earth, such that said N satellites follow N−1 continents, each said satellite having an apogee portion which appears to be virtually geosynchronous.

10. A system as in claim 9 wherein said orbit has a maximum altitude of 16,000 to 18,000 kilometers.

11. A system as in claim 9 wherein said orbit is at an altitude half or less than that necessary for geosynchronous orbit.

12. A system as in claim 9 further comprising a memory on the satellite, each satellite having an apogee portion which is successively over a different one of the followed continents,
   the satellite having structure operating to receive a first communication at a first apogee portion over a first continent, and relaying said communication to a second continent while at said apogee portion over said second continent.

13. A system as in claim 12 wherein each satellite has an apogee portion which has an angular velocity which substantially matches a velocity of the earth's rotation.

14. A system as in claim 13 wherein there are three satellites which follow two continents.

15. A system as in claim 14 wherein the ground station tracks each satellite during a tracking period, and after the tracking period, another satellite comes within 1 degree of said first satellite, to minimize an amount of necessary antenna movement.

* * * * *